US012812025B2

(12) United States Patent
Soni

(10) Patent No.: US 12,812,025 B2
(45) Date of Patent: Nov. 24, 2026

(54) COMMON PARSER-DEPARSER FOR LIBRARIES OF PACKET-PROCESSING PROGRAMS

(71) Applicant: NEC Laboratories Europe GmbH, Heidelberg (DE)

(72) Inventor: Hardik Soni, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 954 days.

(21) Appl. No.: 18/169,292

(22) Filed: Feb. 15, 2023

(65) Prior Publication Data

US 2024/0037429 A1 Feb. 1, 2024

Related U.S. Application Data

(60) Provisional application No. 63/392,504, filed on Jul. 27, 2022.

(51) Int. Cl.

*H04L 69/22* (2022.01)
*G06F 8/41* (2018.01)
*G06N 7/01* (2023.01)

(52) U.S. Cl.

CPC .............. *H04L 69/22* (2013.01); *G06F 8/427* (2013.01); *G06F 8/441* (2013.01); *G06N 7/01* (2023.01)

(58) Field of Classification Search

CPC ........... G06F 8/427; G06F 8/441; G06N 7/01; H04L 69/22; H04L 49/1546; H04L 45/24; H04L 49/3009; H04L 49/3063; H04L 47/622; H04L 47/2441

See application file for complete search history.

(56) References Cited

U.S. PATENT DOCUMENTS

| | | | | |
|---|---|---|---|---|
| 11,005,754 | B1 * | 5/2021 | Baldi | H04L 45/56 |
| 2017/0104852 | A1 * | 4/2017 | Izenberg | H04L 47/2433 |
| 2020/0322465 | A1 * | 10/2020 | Wang | H04L 67/566 |

OTHER PUBLICATIONS

Luinaud, Thomas, et al., Design Principles for Packet Deparsers on FPGAs, The 2021 ACM/SIGDA International Symposium on Field-Programmable Gate Arrays, 2021, 8 pages, [retrieved on Mar. 19, 2026], Retrieved from the Internet: <URL:http://dl.acm.org/>.*

Bosshart et al., Forwarding Metamorphosis: Fast Programmable Match-Action Processing in Hardware for SDN, SIGCOMM'13, Aug. 2013, pp. 99-110, Association for Computing Machinery, Hong Kong, China.

(Continued)

*Primary Examiner* — Geoffrey R St Leger

(74) *Attorney, Agent, or Firm* — Leydig, Voit & Mayer, Ltd.

(57) ABSTRACT

A method for manipulating an intermediate representation of a modular packet-processing program is provided. The method includes receiving a plurality of modules configured to be conditionally executed, the plurality of modules including at least two parsers, ordering, topologically, at least two extracted header instances in a state of each of the at least two parsers, mapping the at least two header instances to use a common memory block, constructing a common parser directed-acyclic-graph (DAG), synthesizing a bitwise operation on a header instance validity bit and a packet validity bit of a common state in the common parser DAG, and outputting the common parser DAG into the intermediate representation.

15 Claims, 18 Drawing Sheets

(56) References Cited

OTHER PUBLICATIONS

The $P4_{16}$ Language Specification, The P4 Language Consortium, May 2021, pp. 1-170.
Jiaqi et al., Lyra: A Cross-Platform Language and Compiler for Data Plane Programming on Heterogeneous ASICs, SIGCOMM '20, Virtual Event, Aug. 2020, pp. 435-450, Association for Computing Machinery, NY, USA.
Hardik et al., Composing Dataplane Programs with µ P4, SIGCOMM '20, Aug. 2020, Virtual Event, pp. 329-343, Association for Computing Machinery, USA.
Hancock et al., HyPer4: Using P4 to Virtualize the Programmable Data Plane, CoNEXT'16, Dec. 2016, pp. 35-49, Association for Computing Machinery, Irvine, CA, USA.
Zhang et al., HyperV: A High Performance Hypervisor for Virtualization of the Programmable Data Plane, ICCCN, Dec. 2017, pp. 1-9, DOI:10.1109/ICCCN.2017.8038396.
Hardik et al., P4Bricks: Enabling multiprocessing using Linker-based network data plane architecture, Dec. 2018, pp. 1-28, hal-01632431v2, https://hal.inria.fr/hal-01632431.
P416 Intel® Tofino™ Native Architecture-Public Version, Apr. 2021, pp. 1-77, Document No. 631348-0001, Intel Corporation.
Infrastructure Networking Infrastructure Application Interface, ipdk, May 19, 2022, https://ipdk.io/documentation/Recipes/InfrastructureNetworking/.

* cited by examiner

```
main (Packet p) {
  Headers hs;
  packet_parser(Headers hs, Packet p) { ... }; // extracts protocol headers, optional
  processing_headers(Headers hs,Packet p) { ... }; // process headers
  packet_deparser(Headers hs, Packet p) { ... }; // reassemble protocol headers,
  optional
  return p;
}
```

FIG. 1

304

```
callee (Packet p){
  Headers hs;
  callee_packet_parser(Headers hs, Packet p) { ... }; // extracts protocol headers,
  optional
  callee_processing_headers(Headers hs,Packet p) { ... }; // process headers
  callee_packet_deparser(Headers hs, Packet p) { ... }; // reassemble protocol headers
  , optional
  return p;
}
```

302

```
main (Packet p){
  packet_parser(Headers hs, Packet p) { ... }; // extracts protocol headers, optional
  processing_headers(Headers hs, Packet p) {
    callee(Packet p); // processes unparsed bytes from packet p
  };
  packet_deparser(Headers hs, Packet p) { ... }; // reassemble protocol headers,
  optional
  return p;
}
```

300

FIG. 3

```
callee_1 (Packet p) { ... };
callee_2 (Packet p) { ... };

main (Packet p){
  packet_parser(Headers hs, Packet p) { ... }; // extracts protocol headers, optional
  processing_headers(Headers hs, Packet p) {
    if ( <condition> ) {
      callee_1(Packet p); // processes unparsed bytes from packet p
    } else {
      callee_2(Packet p);
    }
  };
  packet_deparser(Headers hs, Packet p) { ... }; // reassemble protocol headers,
  optional
  return p;
}
```

400

FIG. 4

```
callee_1 (Packet p) { ... };
callee_2 (Packet p) { ... };

main (Packet p){
  packet_parser(Headers hs, Packet p) { ... }; // extracts protocol headers, optional
  processing_headers(Headers hs, Packet p) {
    callee_1(Packet p); // processes unparsed bytes from packet p
    callee_2(Packet p);
  };
  packet_deparser(Headers hs, Packet p) { ... }; // reassemble protocol headers,
  optional
  return p;
}
```

600

FIG. 6

```
callee_0 (Packet p) { ... };
callee_1 (Packet p) { ... };
callee_2 (Packet p) { ... };
callee_3 (Packet p) { ... };

main (Packet p){
  packet_parser(Headers hs, Packet p) { ... }; // extracts protocol headers, optional
  processing_headers(Headers hs, Packet p) {
    callee_0(Packet p);
    // control statement
    if ( <condition> ) {
      callee_1(Packet p);
    } else {
      callee_2(Packet p);
    }
    callee_3(Packet p);
  };
  packet_deparser(Headers hs, Packet p) { ... }; // reassemble protocol headers,
  optional
  return p;
}
```

800

FIG. 8

```
main (Packet p){
  packet_parser(Headers hs, Packet p) { ... }; // extracts protocol headers, optional
  processing_headers(Headers hs, Packet p) {
    callee_0_processing_headers(Headers hs, Packet p);
    // control statement
    if ( <condition> ) {
      callee_1_processing_headers(Headers hs, Packet p);
    } else {
      callee_2_processing_headers(Headers hs, Packet p);
    }
    callee_3_processing_headers(Headers hs, Packet p);
  };
  packet_deparser(Headers hs, Packet p) { ... }; // reassemble protocol headers,
  optional
  return p;
}
```

900

FIG. 9

COMMON PARSER-DEPARSER FOR LIBRARIES OF PACKET-PROCESSING PROGRAMS

CROSS-REFERENCE TO RELATED APPLICATION

Priority is claimed to U.S. Provisional Patent Application No. 63/392,504, filed on Jul. 27, 2022, the entire disclosure of which is hereby incorporated by reference herein.

FIELD

The present disclosure relates to a method, device, and computer-readable medium for forming a common parser-deparser for libraries of network dataplane packet-processing programs.

BACKGROUND

Network dataplane programs described using a packet-processing framework or domain-specific languages may be composed of multiple modules comprising parsers and deparsers. Modules process a common subset of headers, and parsers and deparsers of modules are executed according to execution control of the main program. Conventional network dataplane programs may repeatedly parse and reassemble the same header instances, which consumes a significant amount of hardware resources and processing time. The overhead on resource consumption and packet processing may be high enough to make repeated parsing and reassembly of the headers impractical for programs with many modules. Also, many hardware targets may not have architecture suitable to parse and reassemble packets multiple times.

Even with domain-specific languages (DSL) and reconfigurable hardware, dataplane programming toolchains may still lack mechanisms to support efficient execution of complex programs composed of multiple modules. In case of software frameworks, there may be an absence of modular approaches for dataplane programming. In most scenarios, modules need to parse and reassemble packets as a part of processing. In addition, different modules may be processing a common set of headers. Therefore, packets may still be required to parse and reassemble repeatedly for the same headers during execution of the main program.

SUMMARY

In an embodiment, the present disclosure provides a method for manipulating an intermediate representation of a modular packet-processing program. The method includes receiving a plurality of modules configured to be conditionally executed, the plurality of modules including at least two parsers, ordering, topologically, at least two extracted header instances in a state of each of the at least two parsers, mapping the at least two header instances to use a common memory block, constructing a common parser directed-acyclic-graph (DAG), synthesizing a bitwise operation on a header instance validity bit and a packet validity bit of a common state in the common parser DAG, and outputting the common parser DAG into the intermediate representation.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 1 is example pseudocode for a network dataplane packet-processing program;

FIG. 3 is example pseudocode for invoking modular dataplane packet-processing programs as modules;

FIG. 4 is example pseudocode for invoking modules in branches of control statements;

FIG. 6 is example pseudocode for invoking modules in sequential order;

FIG. 8 is example pseudocode for invoking modules both in branches of control statements and in sequential order;

FIG. 9 is an expanded example pseudocode for invoking modules both in branches of control statements and in sequential order;

DETAILED DESCRIPTION

Figure 2:
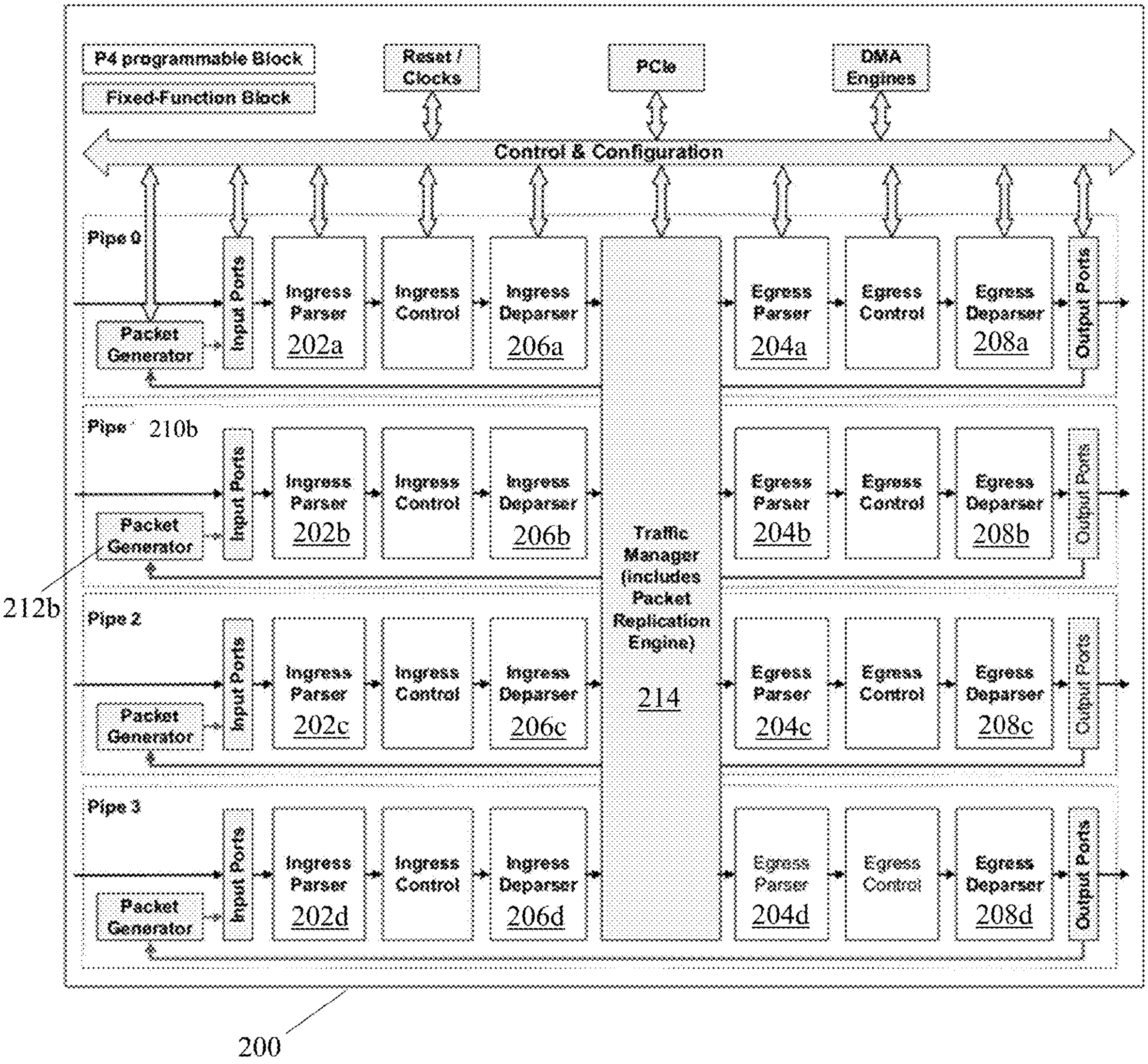
FIG. 2 is a schematic representation of a packet-processing hardware device, Intel Tofino™.

Embodiments of the present invention can synthesize a composed parser and deparser for modules in the main program to eliminate repeated parsing and deparsing by modules and to run parsers and deparsers simultaneously for efficient use of hardware resources. This can also efficiently utilize specialized blocks on chip to increase processing speed and reduce hardware demands, resulting in conservation of computational resources. Embodiments can also be applied to existing programming languages and hardware devices, allowing for wide applicability and optimization.

In a first aspect, a method for manipulating an intermediate representation of a modular packet-processing program is provided. The method includes receiving a plurality of modules configured to be conditionally executed, the plurality of modules including at least two parsers, ordering, topologically, at least two extracted header instances in a state of each of the at least two parsers, mapping the at least two header instances to use a common memory block, constructing a common parser directed-acyclic-graph (DAG), synthesizing a bitwise operation on a header instance validity bit and a packet validity bit of a common state in the common parser DAG, and outputting the common parser DAG into the intermediate representation.

In a second aspect according to the first aspect, outputting the common parser DAG includes instantiating the common parser DAG in a packet-processing hardware device.

In a third aspect, either of the first or second aspects further includes identifying a cycle in the common parser DAG; and removing the cycle from the common parser DAG by replicating the nodes of the cycle in the common parser DAG.

In a fourth aspect according to any of the first, second, or third aspects, synthesizing the bitwise operation includes setting, by a start state of the common parser DAG, a packet validity field for each program; resetting a packet validity bit of the packet validity field of the module if a parse-state does not belong to at least one of the plurality of modules; operating bitwise on a header instance validity bit and the packet validity bit for each module; and masking the packet validity bit for each module to the header instance validity bit.

In a fifth aspect, a method for manipulating an intermediate representation of a modular packet-processing program is provided. The method includes receiving a plurality of modules configured to be conditionally executed, the plurality of modules including at least two deparsers; ordering, topologically, at least two extracted header instances in a state of each of the at least two deparsers; mapping the at least two header instances to use a common memory block; constructing a common deparser DAG; and outputting the common deparser DAG into the intermediate representation.

In a sixth aspect, a method for manipulating an intermediate representation of a modular packet-processing program is provided. The method includes receiving a first module and a second module configured to be sequentially executed, respectively, the first module including a first parser and a first deparser, the second module including a second parser and a second deparser; constructing a union DAG using a DAG of the first parser and a DAG of the first deparser; identifying a pre-parsing hook using static analysis of the first module and the second module; constructing a common parser DAG using the union DAG and a DAG of the second parser; and updating a packet validity bit after the first module by synthesizing code; and outputting the common parser DAG into the intermediate representation.

In a seventh aspect, the sixth aspect further includes ordering, topologically, at least two extracted header instances in a state of each of the first deparser and the second deparser; mapping the at least two header instances to use a common memory block; constructing a common deparser DAG; and outputting the common deparser DAG into the intermediate representation.

In an eight aspect according to either of the sixth aspect or the seventh aspect, outputting the common parser DAG includes instantiating the common parser DAG in a packet-processing hardware device.

In a ninth aspect according to any of the sixth aspect, the seventh aspect, or the eighth aspect, synthesizing code includes adding a header instance validity bit in a selection key of each state of the first module and the second module; identifying outgoing edges using the header instance validity bit; and identifying connected states using the header instance validity bit.

In a tenth aspect, any of the sixth aspect, seventh aspect, eighth aspect, or ninth aspect further includes receiving a plurality of modules configured to be conditionally executed, the plurality of modules including at least two conditioned parsers; ordering, topologically, at least two extracted header instances in a state of each of the at least two conditioned parsers; mapping the at least two header instances to use a second common memory block; constructing a conditional common parser DAG; synthesizing a bitwise operation on a header validity bit and a packet validity bit of a common state in the conditional common parser DAG; and outputting the conditional common parser DAG into the intermediate representation.

In an eleventh aspect according to any of the sixth aspect, seventh aspect, eighth aspect, ninth aspect, or tenth aspect, outputting the common parser DAG includes applying the common parser DAG to a compiler in a P4 programming language.

In a twelfth aspect according to any of the sixth aspect, seventh aspect, eighth aspect, ninth aspect, tenth aspect, or eleventh aspect, outputting the common parser DAG includes applying the common parser DAG to a Clang-LLVM toolchain configured to compile express data path (XDP) programs into Berkeley packet filter (BPF) byte code.

In a thirteenth aspect, a device including one or more hardware processors which, alone or in combination, are configured to provide for execution of the following steps of receiving a plurality of modules configured to be conditionally executed, the plurality of modules including at least two parsers; ordering, topologically, at least two extracted header instances in a state of each of the at least two parsers; mapping the at least two header instances to use a common memory block; constructing a common parser DAG; synthesizing a bitwise operation on a header instance validity bit and a packet validity bit of a common state in the common parser DAG; and outputting the common parser DAG into an intermediate representation.

In a fourteenth aspect, a tangible, non-transitory computer-readable medium is provided having instructions thereon which, upon being executed by one or more hardware processors, alone or in combination, provide for execution of the first aspect.

In a fifteenth aspect, a tangible, non-transitory computer-readable medium is provided having instructions thereon which, upon being executed by one or more hardware processors, alone or in combination, provide for execution of the fifth aspect.

In a sixteenth aspect, a device including one or more hardware processors which, alone or in combination, are configured to provide for execution of any of the first, second, third, or fourth aspects.

Packet-processing hardware devices (e.g., Intel Tofino™) or software running on general purpose central processing units (CPU)s can perform three main operations to process packets in a dataplane or datapath: (1) parse protocol headers; (2) lookup the content of parsed headers in tables to identify actions and/or operations for execution; and (3) reassemble the parsed and/or new protocols headers before sending the packets out. These operations are the tenets of two domain-specific primitives: programmable parser-deparsers and reconfigurable match-action tables. These primitives enable programmable packet processing using domain-specific hardware and dataplane programming languages, e.g., programming protocol-independent packet processors (P4), network programming language (NPL), Lyra, or software frameworks, e.g., express data path (XDP) and dataplane development kit (DPDK). Dataplane programs developed using software frameworks may be written in restricted C, but essentially perform the operations shown in FIG. 1.

Many high-performance hardware targets employ specialized programmable blocks on chip to parse and reassemble packets at line rate. For example, FIG. 2 shows the architecture and programmable blocks of Intel Tofino™ 200, a high-performance packet-processing hardware. In such hardware targets parser and deparser blocks, e.g., ingress parses 202*a*, 202*b*, 202*c*, 202*d*, egress parses 204*a*, 204*b*, 204*c*, 204*d*, ingress deparser 206*a*, 206*b*, 206*c*, 206*d*, egress deparser 208*a*, 208*b*, 208*c*, 208*d* are limited in numbers. Also, the layout and arrangement of the hardware blocks are fixed in the pipeline, e.g., pipe 210*b*. Therefore, it is not possible to access the specialized hardware resources for executing parsers and deparsers of modules, e.g., ingress parser 202*b*, egress parses 204*b*, ingress deparser 206*b*, egress parser 208*b*, according to an execution control of main programs.

The path of packets through the hardware blocks may be dictated by the architecture of the hardware target. For example, in case of Intel Tofino™ 200, it is not possible to use the parser block ingress parser 202*b* in ingress pipe 210*b* without looping the packet from packet generator 212*b* to traffic manager 214 and packet generator 212*b* again. Creating such a processing loop within the pipeline, e.g., pipe 210*b*, may considerably penalize processing throughput and latency. Moreover, for programs that use large numbers of modules, such processing loops may not be practical due to performance requirements. For intended and optimal use of hardware target resources, programs may need to utilize specialized blocks to execute parsers and deparsers of all the modules. In the case of software targets, executing parsers and deparsers of modules may create a huge overhead on throughput if they are processing a common subset of headers.

Approaches that recirculate packets through program modules may degrade performance, and may make the approach infeasible in practice. Also, a program composed of a large number of modules may not fit on the hardware. However, embodiments of the present invention enable modular programming of network dataplane programs that realizes repeated parsing-deparsing of packets using composed modules in an efficient method that also minimizes utilization of hardware resources.

Embodiments of the present invention can also eliminate repetitive parsing and reassembly of packets and efficiently utilize specialized blocks on chip. Embodiments can identify a common subset of headers across the modules and synthesize new parsers and deparsers that can simultaneously run parsers and deparsers of all the modules in the composition. A main program, referred to as a caller hereinafter, may invoke modules, referred to as callees hereinafter, within its body. A caller program may invoke callees from the caller program body in a number of different ways, provided as pseudocode that includes caller and callees in FIGS. 3 and 4. Moreover, embodiments of the present invention also consider combinations of scenarios, e.g., three basic scenarios to reuse multiple modules.

Embodiments of the present invention also apply to compilers of packet-processing languages and toolchains. Embodiments of the present invention can operate on intermediate-representations (IR)s of packet-processing languages and frameworks. For example, embodiments can receive a dataplane processing program or modules of a dataplane processing program in one form (e.g., a text-based programming language such as Lucid, python, C++, or a chip or hardware specific programming language), manipulate the modules of the dataplane program, and output an IR of the modules of the main program.

Scenarios for module invocation: a dataplane program may reuse modules by invoking them, similar to a function call. In addition, control flow statements (e.g., if-else and switch-case) introduce a combination of the following three scenarios to the execution control flow graph of the caller program invoking modules. Example scenarios and their natural combinations to reuse dataplane program modules are provided below.

FIG. 3 provides example pseudocode 300 of a dataplane packet processing program for invoking dataplane programs as modules. The pseudocode 300 in FIG. 3 shows a main program 302 invoking a module of the callee program 304 to process a part of the packet p. A dataplane program may invoke other dataplane programs or modules, e.g., callee 304, to process some part of the packets. A caller program may parse the byte streams of packets, extract headers, process them and invoke a callee program to process the rest of the unparsed byte streams. After the callee program 304 completes processing, it returns the control to the caller, e.g., main 302. The caller, e.g., main 302, completes the processing and reassembles the packets by pushing the extracted headers in front of the packet bytestream processed by the callee. Conventional methods may not provide an equivalent composition operator, or may only allow invoking sub-parsers from parser blocks of the programs. However, embodiments of the present invention allow dataplane programs to invoke other dataplane programs (callees) from any program point within their body. Therefore, caller programs may indirectly execute callees' parsers-deparsers at any point within the body.

FIG. 4 provides example pseudocode 400 for invoking modules in branches of control statements, e.g., conditional statements. Dataplane programming languages and frameworks may provide conditional statements, e.g., if-else and switch. A dataplane program may invoke different callee programs depending on the outcome of the condition in the statement. For example, a caller may invoke a callee program, callee_1, if the conditional expression in the if-else statement is satisfied, otherwise it invokes a different program, callee_2. Therefore, the if-else statement would execute either callee_1 or callee_2. The use of different callee programs in branches of conditional statements results in the execution of one of the callees based on the evaluation of the condition.

Figure 5:
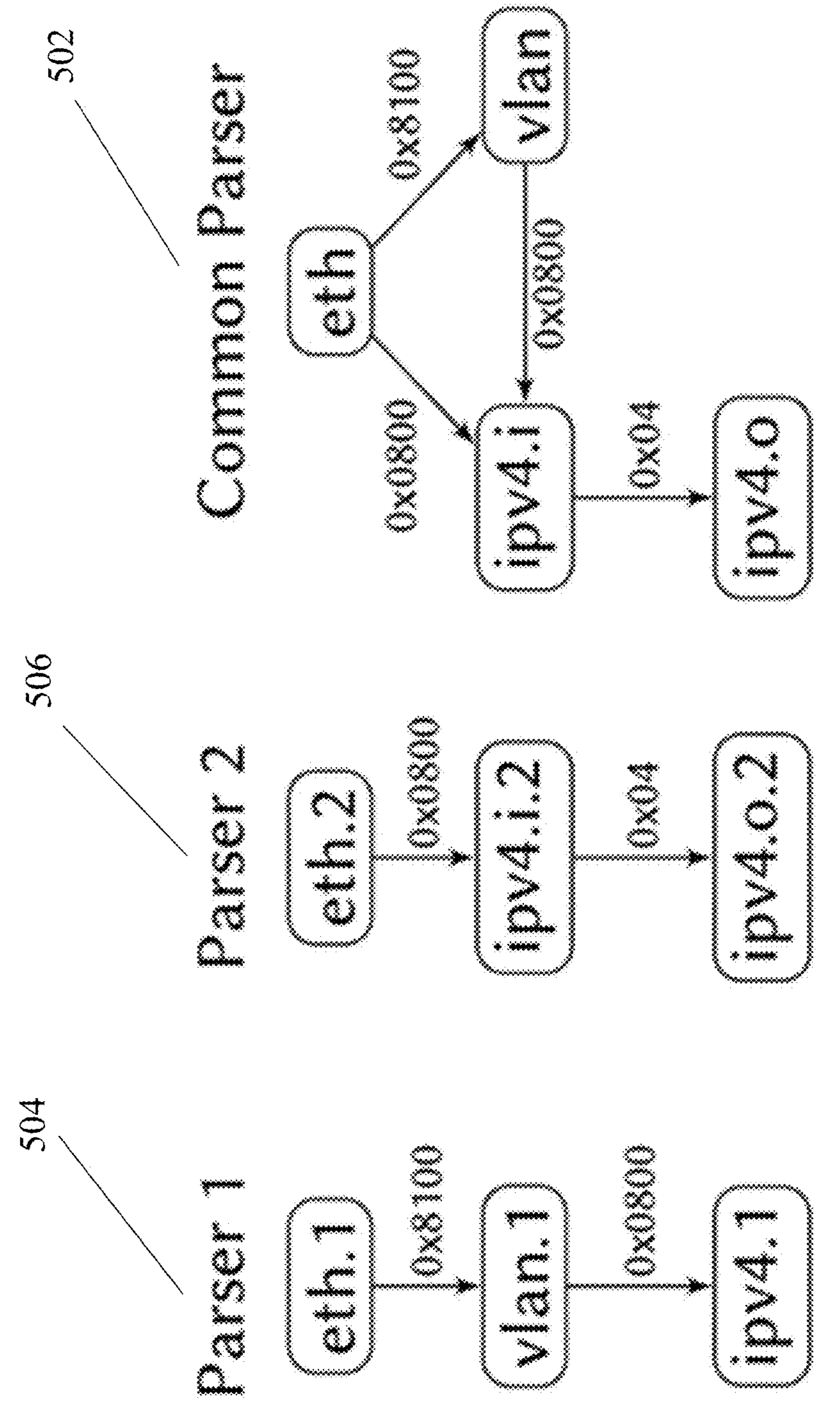
FIG. 5 is a schematic representation of example parsers of modules invoked in a branch of a control statement, and a corresponding expected common parser.

FIG. 5 shows, schematically, structures of example parsers, first parser 504 and second parser 506 of callee_1 and callee_2, respectively, such as callee_1 and callee_2 in the control statement of pseudocode 400. FIG. 5 also show an example of an expected composed parser 502 of the present application. Helper data structures and operations may also form part of the parsers of FIG. 5. For example, parsers and deparsers can have "states" which can each be, semantically, a node of parser/deparser DAG. Moreover, a state can have a selection key (e.g., zero or one) to assist in selection. In FIG. 5, Each state, e.g., node, of parsers 504, 506 is shown with respect to the state it belongs to or processes, e.g., eth.1, eth.2, vlan.1, ipv4.i.2, and with respect to the state that follows or is processed afterwards, e.g., ipv4.1 follows vlan.1 in first parser 504.

FIG. 6 provides example pseudocode 600 for invoking modules in a sequential order. Dataplane programs may invoke more than one dataplane program as a sequence of call statements. FIG. 6 shows pseudocode invoking modules (callee_1 and callee_2) from a main program. In this case, callee_1 may modify content of the packets before callee_2 starts processing. Callee_1 and callee_2 may perform encapsulation, decapsulation or rearrange headers extracted from packets. Specifically, parser and deparser of callee_1 may add, remove or rearrange the packet headers. A parser of callee_2 can then parse packets modified and reassembled by callee_1 and callee_1's deparser.

Figure 7:
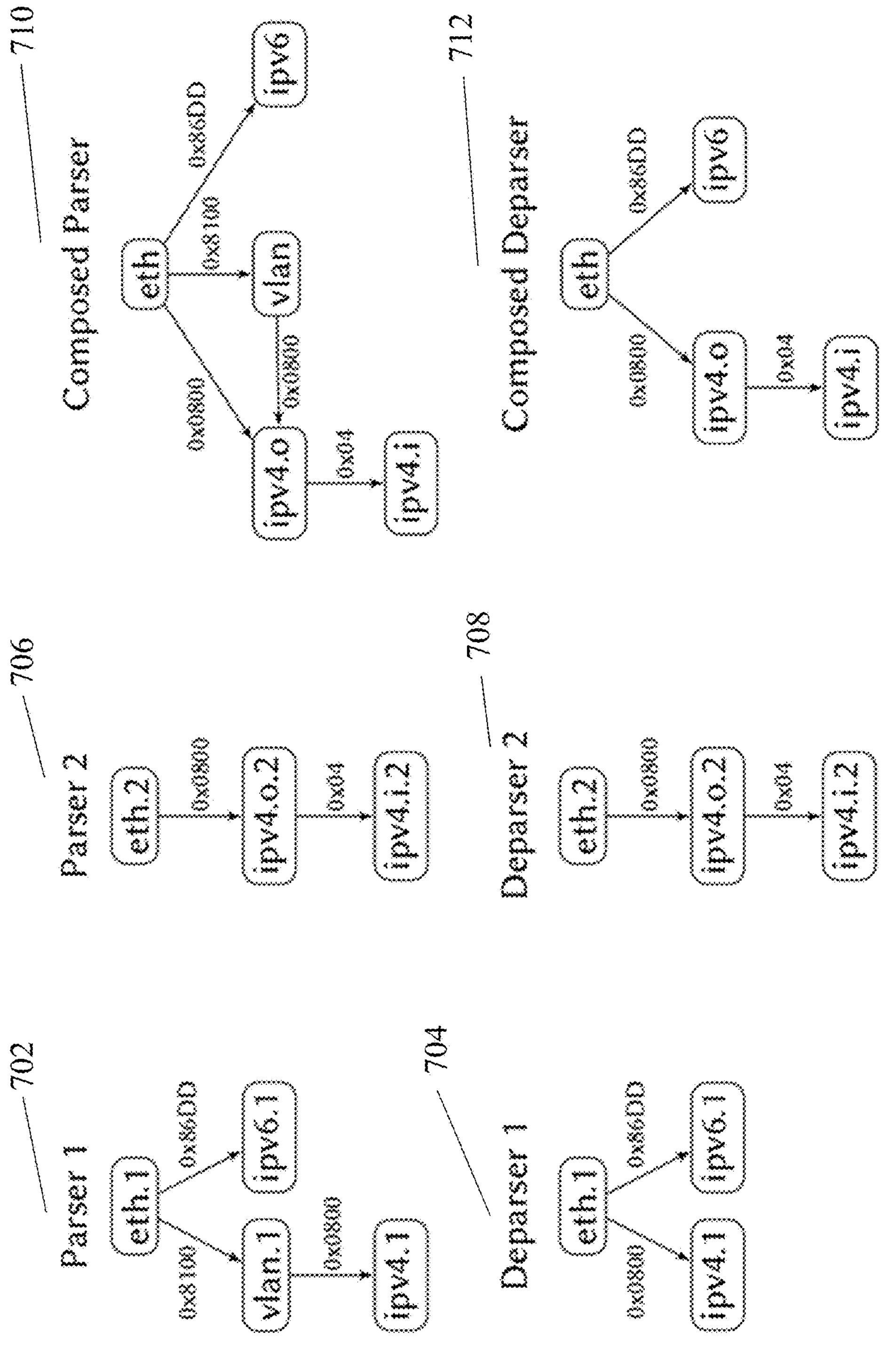
FIG. 7 is a schematic representation of example parsers of the modules invoked in sequential order, and a corresponding expected common parser.

FIG. 7 shows a schematic example of a common parser and deparser for two modules processing packets in sequence. The first module, callee_1, includes first parser 702 and first deparser 704 of callee_1 and the second module, callee_2, includes second parser 706 and second deparser 708. The expected composed parser 710 and deparser 712 results from a mapping of the modules. Header definitions, data structures, and operations may also form portions of the composed parsers and deparsers of FIG. 7.

FIG. 8 provides example pseudocode 800 for invoking modules in a general case, where modules are invoked in different ways. A main program may have its own parser, deparser, and callees, e.g., callee_0, callee_1, callee_2, callee_3, invoked in a sequence and from branches of control statements. For example, the main program of FIG. 8 includes a parser and processes headers according to a sequential execution order for callee_0 and callee_3. Within the sequential execution, however, a conditional execution process is included for either callee_1 or callee_2. Specifically, the main program invokes callee_0, then a conditional statement that executes either callee_1 or callee_2 according to the conditional if-else statement, then callee_3 after the result of the conditional statement. The deparser of the main program then deparses the protocol headers as needed. A main program may use scenarios, e.g., invoking as modules, sequentially, conditionally, multiple times and in different combinations. Pseudocode 900 of FIG. 9 provides a logical expansion of calls to modules in the main program shown in FIG. 8 and further operations able to be performed by the callee functions.

Embodiments of the present invention describe techniques to manipulate the IRs of the programs, including modules used in main programs. Embodiments also describe methods to synthesize new parser-deparsers. Embodiments can receive the module in one form, e.g., text-based programming language such as C language, manipulate the modules of the main program, and output an IR of the modules of the main program.

Programming language independent IRs: most protocol headers have a data dependency on the protocol headers that are encapsulating them. The data dependency can be enforced by globally-defined standards for the format and numbering of protocol headers. For example, Ethernet protocol contains a field, e.g., EtherType, indicating the type of next header in the packet bit stream. However, some protocols may violate the data dependency by adding a custom dependency based on their network policy. Further, they may depend on data not encoded in other protocol headers in the same packet. Such protocols may be designed for use in networks administrated by a single entity. For example, multiprotocol label switching (MPLS) protocol headers do not encode required information to parse the packet bit stream further. Embodiments of parsers and deparsers of the present invention can capture all the data dependency as Directed-Acyclic-Graphs (DAGs) in IRs of packet-processing languages or toolchains. Parsers may extract underlying DAG for the parsers, e.g., from P4 programming languages and extended Berkeley packet filer (eBPF)/XDP programs. For deparsers, in most cases data dependency can be identified to create a DAG. However, some protocols and functionalities like MPLS with encapsulation may utilize explicit information from programmers and languages to extract DAGs for deparsers.

Embodiments of the present invention can transform the IRs of the packet-processing programs that use modules with parsers and deparsers. Embodiments can identify opportunities to eliminate repetitive parsing and reassembly of packets within the main programs, provide mechanisms to reuse extracted headers, and synthesize common parser-deparsers and instruments of the code of the programs to eliminate repetitive parsing and reassembly of packets.

Embodiments can identify reusable memory to store common header instances by matching layout of header structures. Next, embodiments can instrument program code with bit operations to run parsers-deparsers of multiple programs with single common parser-deparser.

Invoking modules in branches of control statements: a control statement can have two branches, e.g., if-else statement, and each branch invokes a different module. An embodiment of a common parser for all the programs in branches of control statements may accept a packet if the packet is accepted by the parser of any of the module. Also, the common deparser may reassemble the accepted packet in the same way as the deparser of the module that accepted it. This procedure can be iteratively applied on control statements with more than two branches and can invoke different modules in their control branches.

Figure 10:
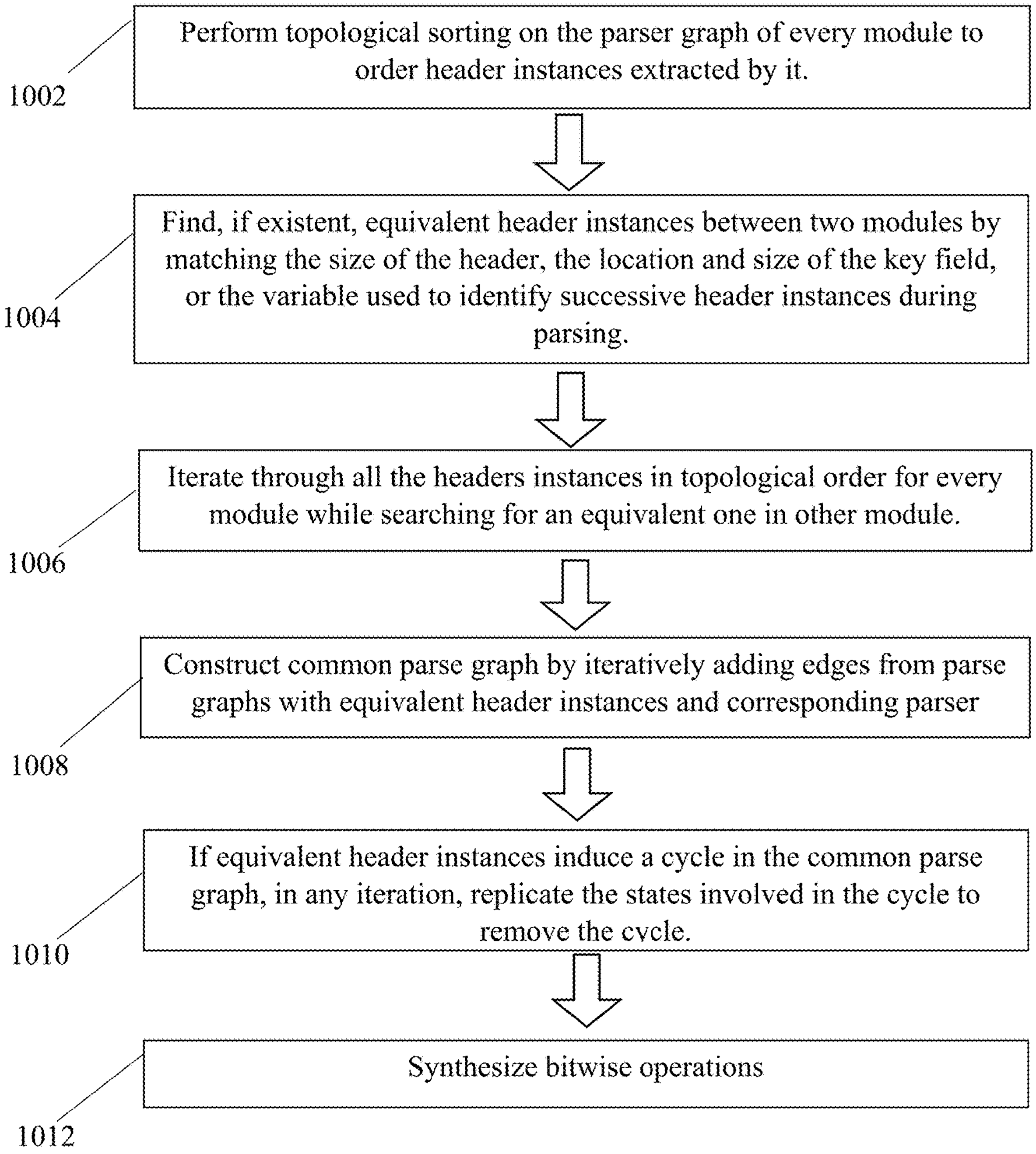
FIG. 10 is an example process for composing a common parser when invoking modules in branches of control statements.

FIG. 10 provides an example process 1000 for constructing a common parse graph when invoking modules in branches of control statements. At step 1002, topological sorting is performed on the parser graph, e.g., DAG, of every module to order header instances extracted by it. The IR and dataplane program can provide information on the structure of headers and header extraction, e.g., a DAG, and each parser can be associated with or provide a DAG or information for constructing a DAG. For example, the IR may provide how the headers of parsers are defined, e.g., 8 bit string, 12 bit string, a specific sequence or position of bits, and how the parsers are described, e.g. how a header is extracted by the parser from the bit string. A DAG can represent this information provided by the IR and the dataplane program. Topological sorting can then utilize the edges of the parser graphs to determine the topological ordering of those parser headers defined or represented by a parser graph. For example, in parsers 504 and 506, eth.1 states may need to be ordered before the following state vlan.1 and eth.2 state may need to be ordered before the ipv4.i.2 state. Accordingly, the topological sorting may order eth.1 before vlan.1, and eth.2 before ipv4.1.2, resulting in a topological sort, e.g., eth.1, eth.2, vlan.1, ipv4.i.2, based on the edges of the parser graphs. Topological sorting can be performed for any information structured, captured, or stored by a parser graph, e.g., DAG, according to any methods known in the art for topological sorting of a DAG.

At step 1004 equivalent header instances are found, if existent. For example, how parsers 504 and 506 are aligned with each other, the states of the parsers, or common anticipated bit strings of the headers can be considered to find similar header instances. These equivalent header instances between two modules can be found using a number of characteristics of the modules or main program, e.g., by matching the size of header, location and size of the key field or matching the variable used to identify successive header instances during parsing.

At step 1006, all the headers instances are iterated through in topological order for every module while searching for an equivalent one in other module. Complimentary header instances (e.g., corresponding header instances or equivalent header instances) are then mapped from different parsers to the same memory block, creating mapped pairs. The mapped pairs can also be the same locations from the incoming bit string, e.g., the same 8 bits that form the headers of each callee. In contrast, conventional methods may match header instances from two modules only at the same level in topological ordering.

A memory block can refer to the portion of memory that contains relevant information located in the dataplane program code (e.g., the parsed headers and/or variables in the code). In the context of Intel Tofino™, a memory block that contains the parsed headers is referred to as a Parsed Header Vector (PHV). Moreover, each structure type can be used to define the logical layout of a memory block in memory, such as: packet headers, packet meta-data, action data stored in a table entry, mailboxes of extern objects, and functions. Similar to C language structures, each structure type can be a well-defined sequence of fields, with each field having a unique name and a constant size. Accordingly, action parameters and stateful objects take memory space. By matching header instances to the same memory blocks, processing and throughput speed can be improved while utilizing fewer memory blocks. For example, a dataplane processing program can receive a packet and place it in a memory block, parse and deparse the packet, e.g., to inspect and process its destination address, look for a match for the destination (e.g., in a forwarding table), and determine the outgoing interface. At step 1008, the common parse graph is constructed by iteratively adding edges from both parse graphs for equivalent header instances and corresponding parser states.

At step 1010, in any iteration in the matching process, if equivalent header instances induces a cycle in the common parse graph, the states involved in the cycle are replicated to remove the cycle. In turn, the common parser would have parallel sub-paths in the parse graph. For example, the common parser may result in mapping one parser to the predecessor or successor in a way that creates a repeating cycle in the DAG, which may not be allowed in the definition of the relevant DAG. Replicating states of the parser to parse those states in parallel, rather than cycling through the same parsers, can alleviate potential problems with cycles in the common parser graph.

In the example process 1000, for every module of the main program, a bit and packet validity field and bit may be synthesized and to implement the steps of process 1000. The common parser formed by process 1000 can operate outside of the bodies of the call statements for the modules of the programs, and the bitwise operations synthesized at step 1012 can assist the common parser's operation. For example, the bitwise operations can be used to perform or edit signaling operations or information stored in a statement file indicating which headers are for which modules. The bitwise operations can record acceptance of the packet by the program during and after parsing, and a validity bit may also be used for every header instance for every module of the main program, which can help to identify and map header instances. The bitwise operations can therefore help to change the order of execution of the modules of the main program upon implementation into the IR, assisting the actuation of the common parser from separate modular parsers. As one form of implementation, the bitwise operations, after or upon synthesis, can be stored in the files of the programs and utilized therein. The following bitwise operations can be synthesized at step 1012 in the common parser, e.g., the common parser formed by the process 1000:

1. The start state of the common parser sets the packet validity field for every program.
2. If a parse-state does not belong to a module, the packet validity bit of the module is reset.
3. Perform bitwise operations on header instance validity bit for every program and packet-validity field.
4. Finally, for each program packet the validity bit is masked to the header instance validity bit.

The common parser may set packet validity bits of more than one module at the end of packet parsing. This means that a parsed packet may be valid for multiple modules invoked in the control statement. Depending on the result of control condition, the packet may be processed by the module invoked in the corresponding control branch.

A common deparser for modules executed in a control statement can be formed following a similar process to composing a common parser in process 1000. The header instances in the states of the deparsers that the deparsers operate on can be ordered by topologically sorting the deparser graphs, e.g., DAGs, of every module. Header instances can be mapped from different deparsers to the use the same memory for mapped pairs. A DAG can be constructed for the common parser. Cycles can be removed from the DAG by replicating the nodes of the cycle. The bitwise operations and indicators synthesized at step 1012 can be utilized by the common deparser to perform common deparsing through the modules of the main program. For example, for the common deparser to perform common deparsing through the modules of the main program, the bitwise operations can read validity bits of headers and accordingly set the packet validity field for the modules that are synthesized.

An example packet acceptance criteria for a common parser for modules invoked in a sequential order is provided by the sequence 500 of the two programs shown in FIG. 5. The common parser 502 for programs callee_1 and callee_2 may accept packets in the following scenarios:

1. If the callee_1 accepts a packet, modifies it and as a result callee_2 rejects the modified packet.
2. If the callee_1 accepts a packet, modifies it and as a result callee_2 accepts the modified packet.
3. If the callee_1 rejects a packet, but callee_2 accepts it.

Callee_1 may add new header instances in and/or remove parsed headers instances from the packets, and its deparser may reassemble header instances in a different order than parsed by its parser.

Figure 11:
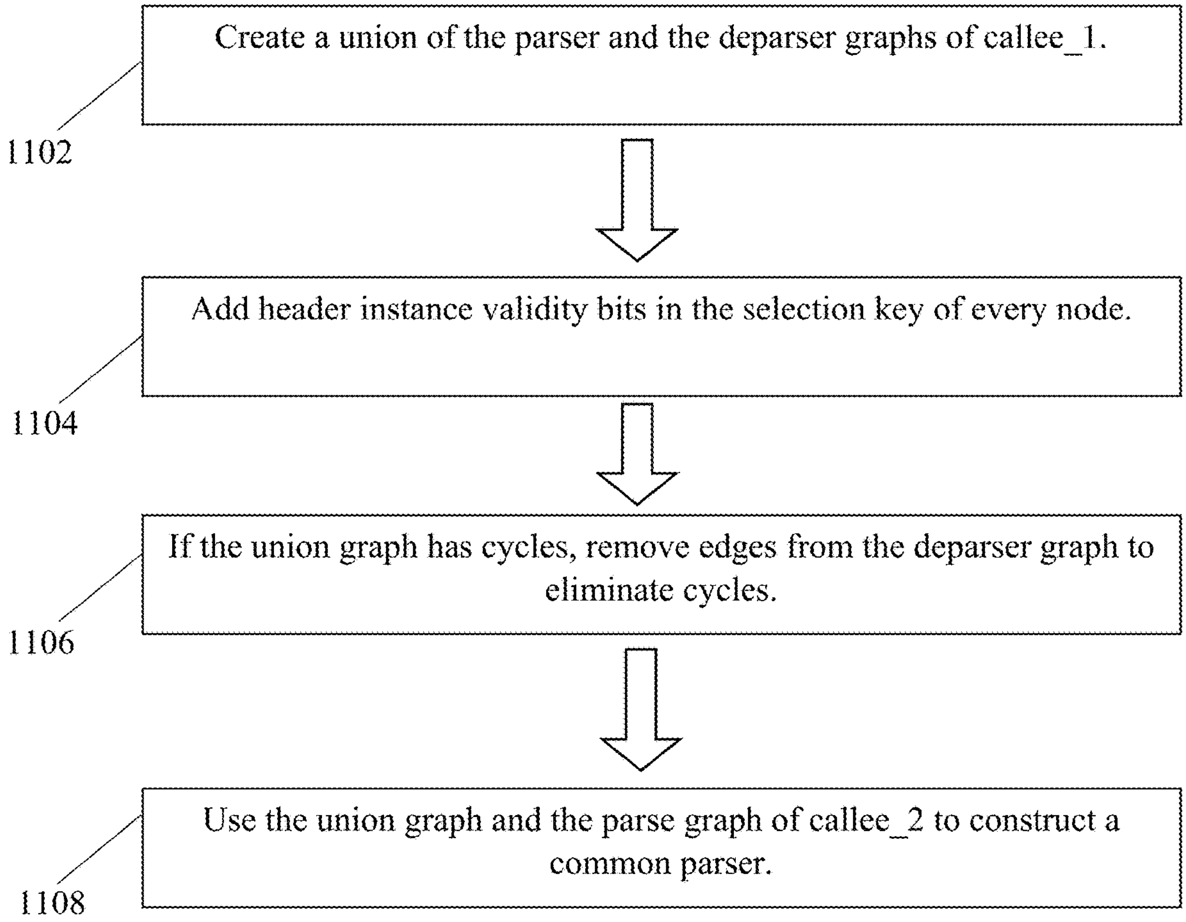
FIG. 11 is an example process for composing a common parser when invoking modules in sequential order.

FIG. 11 provides an example process 1100 that is a part of composing a common parser for invoking modules in a sequential order. To capture potential modifications by callee_1, at step 1102, a union, e.g., a union graph, is created of the parse graphs of callee_1, e.g., parse and deparser graphs. For example, a union graph of the parser DAG and the deparser DAG for the first callee in the sequence can be made. From the union graph of the first callee in the sequence, pre-parsing hooks can be found using static analysis of both the first callee and the second callee, or the first callee any following callee or callees. For example, a callee following the first callee may have header instances which remain unmapped to another parser in the common parsers, and may be required to parse that unmapped header instance in advance. The predecessor that would parse that unmapped header instance, called a pre-parsing hook, would map to the header instances of the following callee. At step 1104, which can be performed while performing step 1102, header instance validity bits are added in the selection key of every state (node) of the parsers and deparsers. This helps to identify outgoing edges and the connected nodes. At step 1106, if the union graph has cycles, edges are removed from the deparser graph to eliminate cycles as a part of the common parser construction.

At step 1108, the union graph and the parse graph of the second or following callee or callees are used to construct a common parser using the process 1000. If the common parser contains states (e.g., nodes) or header instances present only in deparser of callee_1, the states are removed along with their incident edges. Code can then be synthesized for bitwise operations for updating the packet validity after the first callee in the sequence in a similar way as in step 1012 of process 1000. Specifically, even though the bitwise operations themselves that would be performed in the sequential statements may differ from the bitwise operations of the conditional statements, the process for synthesizing those bitwise operations in the sequential statements can be synthesized similarly to the bitwise operations synthesis in step 1012 of process 1000.

A composed deparser for modules invoked in a sequential order can be constructed following a process similar to constructing composed deparsers for modules invoked in a control statement. The header instances in the states of the deparsers that the deparsers operate on can be ordered by topologically sorting the deparser graphs, e.g., DAGs, of every module. Header instances can be mapped from different deparsers to the use the same memory for mapped pairs. A DAG can be constructed for the common parser. Cycles can be removed from the DAG by replicating the nodes of the cycle. The bitwise operations and indicators synthesized at step 1012 can be utilized by the common deparser to perform common deparsing through the modules of the main program. For example, the common deparser can utilize the bit-operations stored in the files of the parser modules to perform similar operations for common deparsing.

Embodiments of the present application can be P4 compiler toolchains for packet-processing accelerators. For example, hardware accelerators such as smart network interface cards (SmartNIC)s, data processing units (DPU)s, display stream comparison (DSC)s, intelligence processing units (IPU)s, and field programmable gate arrays (FPGA)s are used in cloud and high-performance computing (HPC) infrastructures to process packets at line rates in orders of hundreds of gigabits per second. They help to offload the packet-processing workload from CPU cores. However, programming the accelerators to offload packet-processing workloads of multiple tenants may require a modular approach.

NVIDIA DOCA™, Intel's infrastructure programmer development kit (IPDK) and open programmable infrastructure (OPI) are open-source efforts to develop common application programming interfaces (API)s to program the hardware accelerators with heterogeneous architecture. These software development kits can essentially standardize programming interfaces and abstractions. However, the hardware-specific implementation of compiler toolchains for these software development kits may be proprietary to and closed by device vendors. Also, the compiler toolchains may require to support the composition of packet-processing functions specified using the open APIs. Embodiments of the present application can apply to the mid-ends and the back-ends of such compiler toolchains. For example, embodiments can access the files of the modules or programing of these toolchains and operate on those files of these compiler toolchains. In addition, or alternatively, embodiments can also operate as their own toolchain.

For example, implementing a target abstraction interface (TAI) provided by IPDK may require compiler toolchains for various hardware targets. In IPDK, P4 is widely used to describe the dataplane component of packet-processing functionalities for different target devices, including software targets like DPDK and open vSwitch (OVS). The embodiments of the present application that involve dataplane module-invocations can enable multitenancy and modular development, and in order to do so, may handle the mid-end of compilers, e.g., the files of the IRs, for current and future versions of P4 and similar languages for dataplane programming.

Embodiments of the present application can also be applied to a Linux networking stack, e.g., a Berkeley packet filer (BPF).

XDP enables programmable packet processing in the kernel space of the operating system (OS) using eBPF technology that provides a sandboxed execution environment to custom programs in the kernel space of the OS. XDP benefits from security and isolation mechanisms provided by the OS. With XDP, the OS kernel provides the required flexibility to load custom packet-processing programs in the networking stack of the OS.

XDP programs may be written using restricted-C. They are compiled into BPF byte code using the Clang-LLVM compiler toolchains. The BPF byte code is loaded onto a network interface using the XDP-loader. Because XDP programs may be executed in the kernel space of the OS, the BPF byte-code of every XDP program may be statically analyzed to guarantee runtime safety properties (e.g., privileges, memory faults, invalid operations and termination, etc.) to the Linux kernel. Once the BPF byte-code passes the verification check, just-in-time (JIT) compilation can translate the BPF byte-code into the target machine-specific binary code.

XDP allows the loading of multiple programs on the same network interface by a mechanism, e.g., Chain-call or Tail-call. XDP can also leverage the function calls mechanism to compose XDP modules. To enable chain calling, XDP can invoke each program in the chain using a wrapper, e.g., the Dispatcher program.

Neither any pass in the Clang-LLVM toolchain nor the Dispatcher program performs code transformations on the chain of the XDP programs. The embodiments of the present application that involve dataplane module-invocations can be applied to the mid-end of the Clang-LLVM toolchain used to compile XDP programs into BPF byte code.

Steps and methods to compose parsers and deparsers of embodiments of the present invention for two modules for control statements and sequential statements. The parsers and deparsers of callee_1 and callee_2 shown in FIGS. 4 and 6 assist the description of the steps and methods.

An embodiment of the present invention is a composed parser-deparser for module calls in control statements. A composed parser can be synthesized to run network packet parsers of different modules simultaneously and to maximize sharing of memory resources and variables, e.g., packer header vectors (PHV)s, among the header instances extracted by parsers of the modules. A composed deparser can be synthesized to run network packet deparsers of different modules simultaneously by selecting appropriate variables and memory shared among header instances of the modules.

An embodiment of the present invention is a composed parser-deparser for module calls in sequential order. A composed parser can predict header extraction for the second module in the sequence even if the first program adds or remove headers from packets; and can maximize sharing of memory resources and variables (e.g., PHVs) among the header instances extracted by parsers of the modules. The composed parser can be synthesized that parses network packets according to the first program and pre-parse headers for the modules later in the sequence (second program), and can synthesize header processing code to replace the deparser of the first program. A composed deparser can be synthesized to run network packet deparsers of different modules simultaneously by selecting appropriate variables and memory shared among header instances of the modules.

The input of a parser of a composed parser-deparser for module calls in control statements can be parsers of modules, and the output can be a composed parser. A parser of the composed parser-deparser for module calls in control statements can be executed according to the process 1000, and/or by:

1 Topologically ordering of extracted header instances in the states of the parsers;
2. Mapping headers instances from different parsers to use the same memory for mapped pairs;
3. Constructing a DAG for the common parser;
4. Removing cycles from the DAG by replicating the nodes of the cycle; and Synthesizing bitwise operations on header and packet validity bits in the common parser states.

The input of a deparser of a composed parser-deparser can be deparsers of modules, and the output can be a composed deparser. A deparser of the composed parser-deparser for module calls in control statements can be executed according to steps 1002 to 1010 of the process 1000, and/or by:

1. Topologically ordering extracted header instances in the states of the deparsers;
2. Mapping headers instances from different deparsers to use the same memory for mapped pairs;
3. Constructing a DAG for the common deparser; and
4. Removing cycles from the DAG by replicating nodes.

The input of a parser of a composed parser-deparser for module calls in sequential order can be modules in the sequential order, and the output can be a composed parser. A parser of the composed parser-deparser for module calls in sequential order can be executed according to the process 1100, and/or by:

1 Creating a union of parser and deparser DAGs of the first program in the sequence;
2. Finding pre-parsing hooks using static analysis of both modules;
3. Constructing a parser using the union DAG parser and deparser of the first module and the parser DAG of the second module; and
4. Synthesizing code to update a packet validity bit after the first module in the sequence.

For example, synthesizing code involving the packing validity bit, e.g., how the validity bit is instituted, reset, and updated, can result in an assignment operation on a variable, if a particular condition is met. For instance, the assignment operations could be:

module1packet.valid=1 to set
module1packet.valid=0 to reset.

More specifically, these operations are actions to perform. And, these conditions can be instituted by matching validity bits of headers extracted by the module. If module1 is extracting Ethernetheader and ipv4header to accept (to consider the packet as a valid to process for it), the synthesized operations can resemble the following:

```
If (Ethernetheader.valid==1 and ipv4header.valid==1)
  {module1packet.valid=1}
```

This code can be also converted into match-action operations. For example, with matching fields: (Ethernetheader. Valid, ipv4header.valid) and matching values: (1, 1), the action on successful match would be module1packet.valid=1, as shown by the following:

```
If (Ethernetheader.valid==1 and ipv4header.valid==1)
  {modulelpacket.valid=1}
##convert this code into match-action operations ##
Matching fields: (Ethernetheader. Valid, ipv4header.valid)
Matching values: (1,1)
Action on successful match:
  module1packet.valid=1
```

The input of a deparser of a composed parser-deparser for module calls in sequential order can be modules in the sequential order, and the output can be a composed deparser. A deparser of the composed parser-deparser for module calls in sequential order can be executed by synthesizing a composed deparser from network packet deparsers of different modules to run simultaneously by selecting appropriate variables and memory shared among header instances of the modules.

μP4, built on top of P4, allows the development of reusable modules with interfaces using higher level of abstractions for dataplane. μP4 provides a compiler toolchain to link modules for creating complex programs. However, μP4-composed programs may consume a considerable amount of hardware resources. A Lyra compiler can compose multiple packet-processing functions on the same device, but requires all the functions required in the entire network to share vital code fragments, e.g., parsers, deparsers and headers, as global constructs. This is due to a one-big-switch abstraction provided by Lyra to program entire network and decompose the programs using the Lyra compiler to generate device-specific code. μP4 and Lyra may enable modular programming and composition for their respective use-cases, but they neither identify equivalent headers from packets nor generate a common parser and deparsers to parse and reassemble packets using single parsers and deparsers.

P4Visor can use lightweight virtualization for building and testing modular programs. P4Visor may synthesize a parser and a deparser but only for different versions of a P4 program. P4Visor exploits the fact that most of the code fragments in different versions of a P4 program will be common. However, P4Visor does not automatically identify common or overlapping parsers, deparsers and headers across different programs or the P4 programs that are developed by different programmers but perform the same functionality. P4Visor can improve on resource consumption and processing efficiency, but only for modular deployment of the different versions, e.g., production and test, of a P4 program.

P4Bricks may attempt to find equivalent header instances among parsers-deparsers of P4 programs, but assumes that all the parsers-deparsers process the same protocol headers stack. Moreover, P4Bricks also assumes that P4 programs do not perform encapsulations, adding new headers. P4Bricks considers deparsers using a sequence of emit statements appending headers to reassemble packets.

Embodiments of the present invention differ from existing work on compiler toolchains. For a few examples, embodiments differ in the deparser representation in the IR of packet-processing languages, in the packet encapsulation and decapsulation, and the composition operators and module invocation.

Embodiments can involve deparser representation in the IR of packet-processing languages. For example, P4Bricks operates on compiled P4 programs. In the input of P4 programs, parser-deparsers are described using a sub-language of P4. Specifically, packet reassembly in deparsers can be specified by calls to an external function, e.g., a special function "emit," provided by the core library of the P4 language. Each call to the emit function takes a header instance as the argument. On execution, the emit function appends the header if the header instance is valid, otherwise no operation is done. With this semantics, the header instance provided as the argument is appended without evaluating any condition on other header instances or variables. Therefore, in compiled P4 programs, deparsers may be stored as a sequence of the emit function calls.

Embodiments can consider different semantics for the emit function of dataplane programming languages like μP4. For example, when deparsers are represented similarly as parsers in P4 programs, on execution of the emit function call, the header instance provided as the argument can be appended without checking the validity of the instance. To describe parsers, P4 provides a sub-language to encode DAGs that allow for the extraction of headers based on values of already extracted header fields or variables. Embodiments can consider the deparsers that are encoded as DAGs in the IR of the programs, e.g., when deparser DAGs provide explicit dependency among headers emitted by the programs. For example, if a program emits an instance of the IPv4 header followed by an instance of the Ethernet header, the DAG must also encode a condition that checks if the EthType field value is equal to 0x0080.

Embodiments can involve packets encapsulation and decapsulation. P4Bricks does not find equivalent headers among parsers-deparsers of P4 programs that perform encapsulations. Moreover, P4Bricks merges parsers-deparsers of the programs if any of the P4 program module is performing encapsulations by adding new headers to incoming packets as a part of packet-processing. Embodiments can apply to all the dataplane programs with the above constraints on the IR of deparsers, including the ones that perform encapsulation and decapsulation. Embodiments can also provide mechanisms to find equivalent headers among program modules that add and remove headers from packets, performing encapsulation and decapsulation.

Embodiments can involve composition operators and module invocation. For example, to extract equivalent header instances among parsers-deparser of P4 Programs and merge them, P4Bricks can define two composition operators, parallel and sequential. Under parallel composition of P4 programs, in some settings, only one of the programs can modify and the others only read packet contents before any modification. Under sequential composition of P4 programs, every program in the sequence completes all its operations (reads and writes) on packets before the next one starts processing. P4Bricks does not provide a composition operator equivalent to invoking 'dataplane programs as modules,' whereas P4 allows invoking subparsers from parser blocks of the programs. Embodiments of the present invention, however, can utilize dataplane programs that invoke other dataplane programs (callees) from any program point within their body. Therefore, caller programs of embodiments of the present invention may indirectly execute callees' parsers-deparsers at any program point within the body.

P4Visor provides a composition operator that can be matched with module calls in branches of control statements of main programs. However, P4Visor enforces a constraint that the modules in branches of control statements should be different versions of the same program. The use of different versions of the same programs in branches of conditional statements may result in the execution of one of the versions based on the evaluation of the condition, whereas the parallel composition operator of P4Bricks may allow executing read operations to all the callee programs.

Embodiments can involve virtualization tools and Linux networking stack. For example, Hyper4 and HyperV aim to enable modular deployment of dataplane programs using virtualization. Hyper4 and HyperV provide full virtualization, but may incur heavy overhead not only on hardware resource consumption but also on throughput and delay for packet processing. Hyper4 or Hyper5 do not identify common headers or create common parser and deparser for tenant program modules.

Using eBPF technology of Linux kernel networking stack, XDP provides programmable packet processing. The Linux kernel allows one XDP hook per network device to handle packet events from the device. Therefore, packet-processing applications using XDP may have to take complete control over the XDP hook of the device, thereby monopolizing packet-processing for the network device. Using the libxdp library, programmers can attach multiple XDP programs to the same network interface. The libxdp uses a dispatcher to execute a sequence of XDP programs sorted based on their priority numbers. However, neither the dispatcher nor libxdp identifies equivalent headers extracted by the programs in the sequence. Also, they does not perform code motion and program transformations to create a common parser-deparser for the entire sequence of the XDP programs. For example, the first program may extract Ethernet and Ipv4 headers, modify them, and reassemble the packet with the modified headers. The second program in the sequence may extract the same headers, process them, and reassemble the packet. In this case, the dispatcher would execute the sequence based on the return code from the first program. Therefore, extractions and packet reassembly for the same headers happen multiple times. Contrary to some embodiments of the present invention, they neither identify equivalent headers nor creates new parser-deparser code for the entire sequence of the XDP programs.

Embodiments of the present invention may require deparsers represented as DAGs. Other embodiments may not require deparsers represented as DAGs, for example, by removing the limitations by complete automation, or by programmer-assisted methods.

Embodiments of the present invention may support modular development using proprietary libraries of packet-processing dataplane programs. This may be exhibited in the memory footprint of the output of the compiler or toolchain of the system.

Embodiments of the present invention provide increased modularity and portability, e.g., over integrated development environment (IDE)s like dataplane incremental programming environment (DAPIPE). Moreover, embodiments can avoid the use of IDEs to add modules that require manual modification of code base to add module functionality.

Parsing and deparsing are steps in the processing of network packets in the dataplane or datapath of network devices. Dataplane programs described using a packet-processing framework or domain-specific languages may be composed of multiple modules comprising their parsers and deparsers submodules. Parsers and deparsers of modules can be executed according to execution control of the main program. If the main program and modules are processing a common subset of headers, repeated parsing and reassembly of the same headers may consume a significant amount of hardware resources and processing time. Also, many hardware targets may not have architecture suitable to parse and reassemble packets repeatedly according to the invocation sequence of the modules. Embodiments of the present invention can eliminate repeated parsing and deparsing by modules and provide for efficient use of hardware resources. Embodiments can synthesize new parsers and deparsers modules for the main program, and enable the reuse of packet-processing programs developed using software frameworks like eBPF/XDP by different organizations and individuals without looking into the source code. For reconfigurable hardware specialized for packet-processing, embodiments may allow efficient utilization of on-chip resources like memory to store parsed headers, match-action units processing the parsed headers, and programmable blocks specialized for packet parsing and reassembly.

There are many parsers and deparser compositions. A dataplane program may reuse modules by invoking them, similar to a function call. In addition, control flow statements, e.g., if-else and switch-case, introduce a combination of at least three scenarios, e.g., when invoking dataplane programs as modules, when invoking modules in branches of control statements, and when invoking modules in a sequential order, of the execution control flow graph of the caller program invoking modules.

Dataplane programs can be invoked as modules. A dataplane program may invoke other dataplane modules to process network packets. A caller program may parse network packets to extract headers, process them, and invoke a callee module to process the rest of the unparsed packets. The callee module can return the control to the caller on completion. The caller can complete the processing and reassemble the packets by appending the returned packets to the processed headers. The pseudocode 300 in FIG. 3 provides an example of a main program 302 invoking the program to process a part of the packet p. Embodiments of the present invention can utilize dataplane programs that can invoke modules from any program point within their body. In FIG. 3, main program 302 invokes callee 304 when it processes the extracted headers.

Dataplane programs can invoke modules in branches of control statements. For example, dataplane programming languages and frameworks provide conditional statements, e.g., if-else and switch. A dataplane program may invoke different callee programs depending on the outcome of the condition in the statement. For example, as shown in FIG. 4, if the conditional expression 406 in the if-else statement evaluates to true, the caller invokes callee 1 402 module. Otherwise, it invokes callee_2 404. Therefore, the conditional expression 406, e.g., the if-else statement, would execute either of the modules, depending on the evaluation of the condition.

FIG. 5 shows example parsers drawn as DAGs, first parser 504 of callee_1 and second parser 506 of callee_2 of FIG. 4, with an expected composed parser 502. The parsers shown in FIG. 5 can also utilize helper data structures and operations.

Dataplane programs can be invoke modules in a sequential order. For example, dataplane programs may invoke more than one dataplane module as a sequence of call statements. FIG. 6 shows pseudocode 600 invoking modules calee_1 and callee_2 from main program. In the example of FIG. 6, callee_1 may modify content of the packets before callee_2 starts processing. Callee_1 and callee_2 may perform encapsulation, decapsulation or rearrange headers extracted from packets. Callee_1 may add, remove, or rearrange the packet headers. The parser of callee_2 parses the packet modified and reassembled by callee_1 and its deparser.

FIG. 7 shows structures of example parsers, first parser 702 and first deparser 704 of callee_1 of FIG. 6, and second parser 706 and second deparser 708 of callee_2 of FIG. 6, with an expected composed parser 710 and deparser 712. The parser and deparser structures shown in FIG. 7 can also utilize header definitions, data structures, and select operations.

A main program may have a parser and deparser, and invoke dataplane modules both in a sequence and from branches of control statements. Dataplane programs may use module invocation mechanisms, e.g., control, sequentially, multiple times and in different combinations. FIG. 8 provides example pseudocode 800 that invokes four callee programs callee_0, callee_1, callee_2, and callee_3 in different ways. FIG. 9 provides a logical result for the complex program shown in FIG. 8.

Embodiments of the present invention can involve programming language independent IRs. Protocol headers may have data dependency on the protocol headers that are encapsulating them. The data dependency can be enforced by globally-defined standards for the format and numbering of protocol headers. For example, Ethernet protocol contains afield, EtherType, indicating the type of next header in the packet bitstream.

However, some protocols may violate the data dependency by adding a custom dependency based on their network policy. Further, they may depend on data not encoded in other protocol headers in the same packet. Such protocols may be designed for use in networks administrated by a single entity. For example, MPLS protocol headers do not encode required information to parse the packet bitstream further.

Parser and deparsers of embodiments of the present invention can capture all the data dependency as a DAGs in IRs of packet-processing languages or toolchains. For example, parsers can extract underlying DAG for parsers from NPL or eBPF programs, and for deparsers, in most cases, can data dependency can be identified to create a DAG. However, some protocols and functionalities like MPLS with encapsulation may require explicit information from programmers and languages to extract DAGs for deparsers.

Embodiments of the present invention can compose parsers and deparsers in many settings and for different modules, e.g., modules in branches of control statements and modules in a sequential order. Embodiments can model network packet parsers and deparsers as finite state machines or finite automata. Embodiments can utilize parsers which essentially segment packet bitstreams into pre-defined sizes of memory blocks, where those memory segments hold header instances defined in P4 programs. Blocks of memory that can store header instances from different parsers can be identified and finite state machines that simultaneously runs state machines for parsers of multiple programs can be created.

Embodiments can create a mapping between the header instances extracted by parsers of different programs. For example, two header instances can be mapped if they satisfy two criteria: (1) equal size of the header instances; and (2) location and size of the field used to decide parsing after extraction of the header instances. The memory block of a header instance can then be reused to store the header instance mapped to it.

Figure 12:
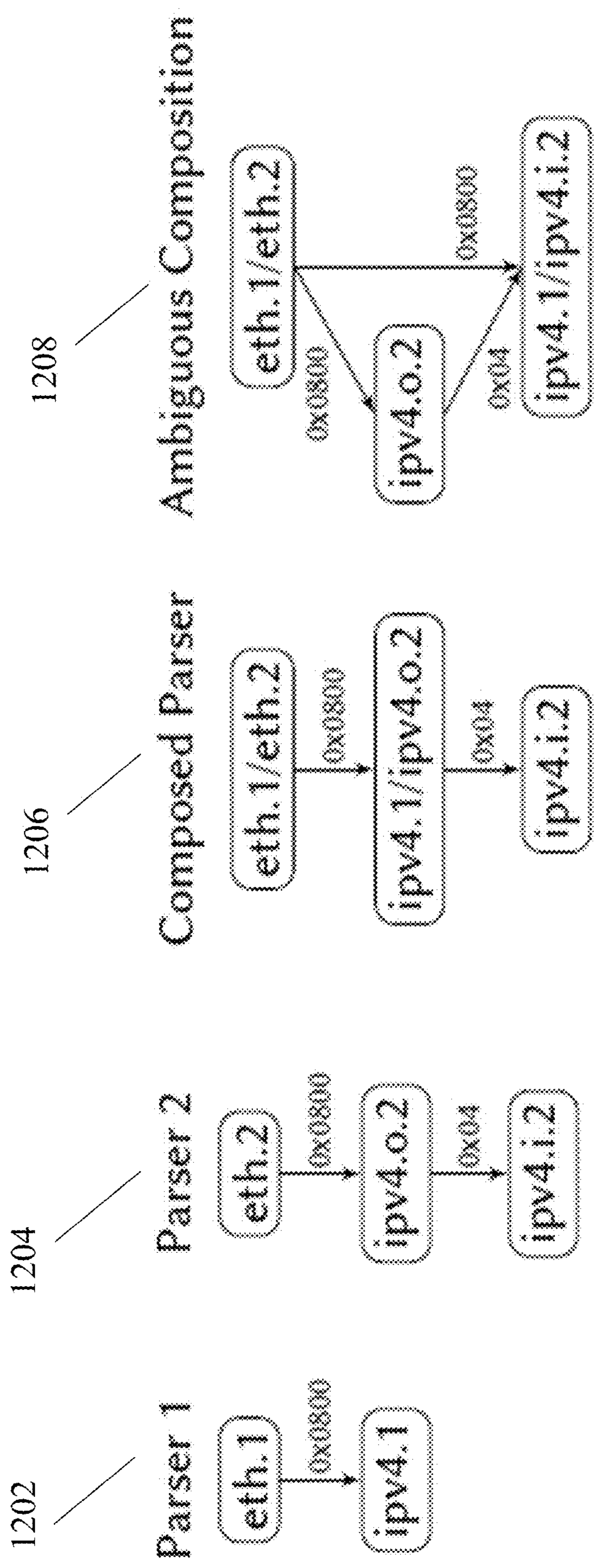
FIG. 12 is a schematic representation of mapping two parsers to a common parser and to an ambiguous common parser.

A header instance extracted by the parser of one module can get mapped to more than one header instance extracted by the parser of the other module. FIG. 12 shows parsers 1202, 1204 of two programs and a composed parser 1206 formed by an embodiment of the present invention as an example. Header instance ipv4.1 can be mapped to ipv4.o.2 as in the composed parser 1206, or ipv4.i.2 and use the same memory blocks as ipv4.o.2 or ipv4.i.2. Mapping ipv4.1 with ipv4.i.2 can create ambiguity, e.g., ambiguous composition 1208, while simultaneously emulating first parser 1202 and second parser 1204. To avoid ambiguity in these compositions, e.g., as between the two mappings of composed parser 1206 and ambiguous composition 1208 between the multiple instances of the a header type with the same relative order of extractions in their respective parsers, the mapping of header instances is prioritized that accords with the scanned topological order of header instances.

Network packets can have a common and globally-defined structure to encode protocol headers in a consistent order. With this domain-specific information, embodiments can leverage the underlying order of the protocol headers to map header instances. For each module, the header instance is sorted in a topological order of their extraction from the parser. Scanning the header instances in topological order can prioritize the mapping between the multiple instances of the a header type with the same relative order of extractions in their respective parsers.

Figure 13:
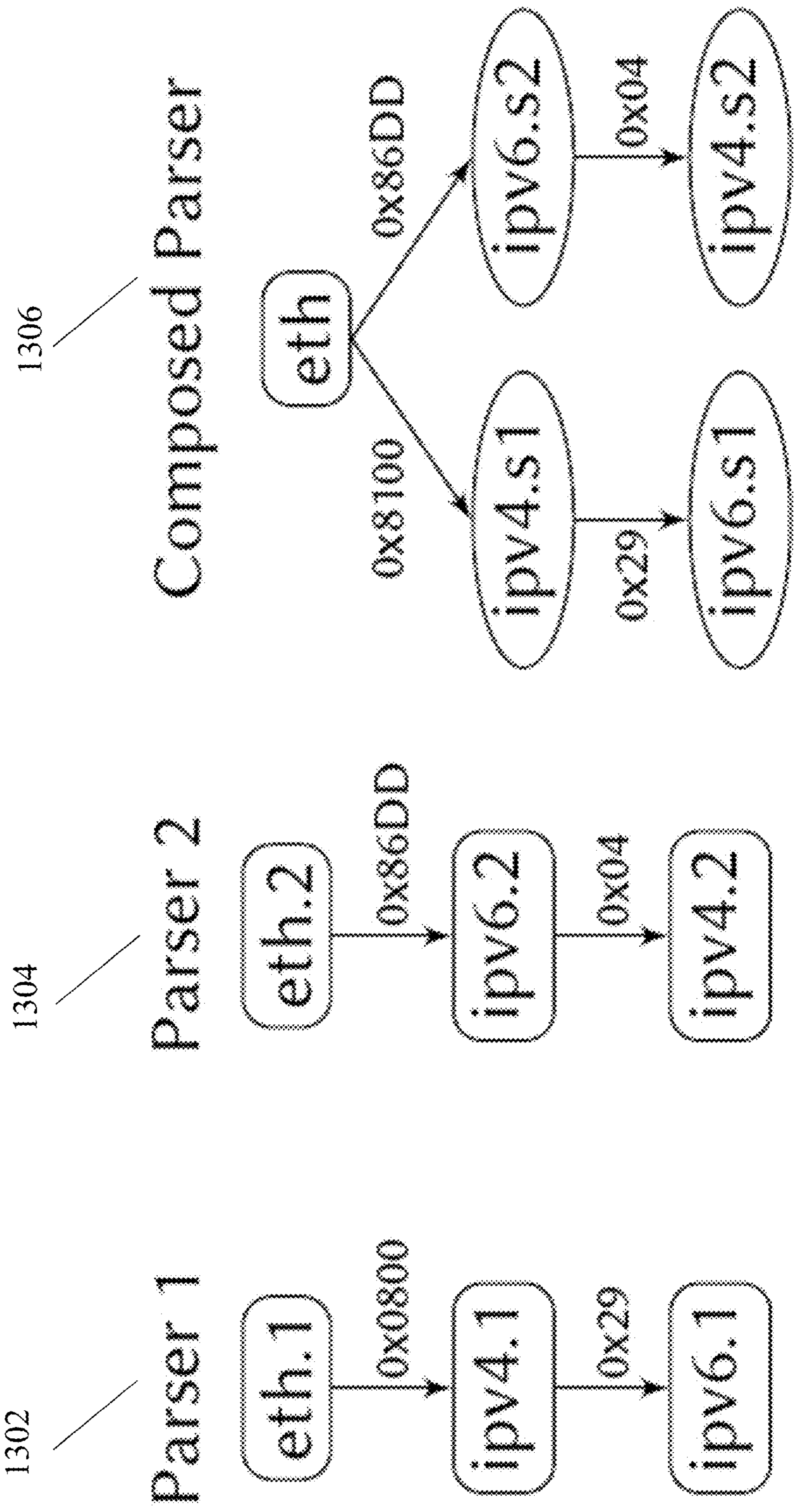
FIG. 13 is a schematic representation of mapping a first parser and a second parser that rearranges headers to a common parser.

Although network packets cam be encoded using a globally-defined format, some programs may encode packets with subsequences of header instances in the reverse order compared to others. Therefore, a packet parser may extract a subset of headers in a relatively reverse order than parsers of other modules. For example, first parser 1302 in FIG. 13 extracts ipv4.1 followed by ipv6.1 whereas second parser 1304 first extracts ipv6.2 followed by ipv4.1. Topologically ordered scanning can map ipv4.1 with ipv4.2 and ipv6.1 with ipv6.2 in the composed parser 1306. This mapping may result in a cycle while simulating both parsers simultaneously. To prevent formation of cycles in the composed parser, common parsers can replicate states extracting the mapped header instances. However, maintaining the mapping of header instances can also assist reusing them across parallel subpaths.

Embodiments can synthesize bitwise operations in the states of the composed parser to track the simultaneous execution of module parsers. Dataplane programming languages like P4 may provide metadata associated with header instances and packets to record their validity for the module. Code can be synthesized to set the bit recording packet validity and select transitions or extract the headers that do not belong to the module parser. Finally, masking is performed of the header validity bits for each module with its packet validity bit. To run the deparser of modules simultaneously, an approach similar to parsers can be used, but with necessary modification in the synthesis of bitwise operations.

To create a composed parser for modules invoked in sequential order, all headers can be identified that may require processing of the packets by all the modules in the sequence. Network packets can be encoded using a finite number of protocol headers with pre-defined maximum sizes, and a module may modify the packet bitstream by adding and removing headers. Also, the composed parser may rearrange headers in a different order than extracted by the parser. If the parser of a module in a sequence accepts a packet to process it, the successor of the module processes the modified packet. If the parser of a module rejects a packet, the successor should process the original copy of the packet.

FIG. 6 provides an example of the packet acceptance criteria for the composed parser for modules invoked in sequential order. The composed parser 706 of FIG. 7 for callee_1 and callee_2 of FIG. 6 should accept packets in the following cases:

1. If callee_1 rejects a packet, but callee_2 accepts it.
2. If callee_1 accepts a packet, modifies it and callee_2 rejects the modified packet.
3. If callee_1 accepts a packet, modifies it and callee_2 accepts the modified packet.

Figure 14:
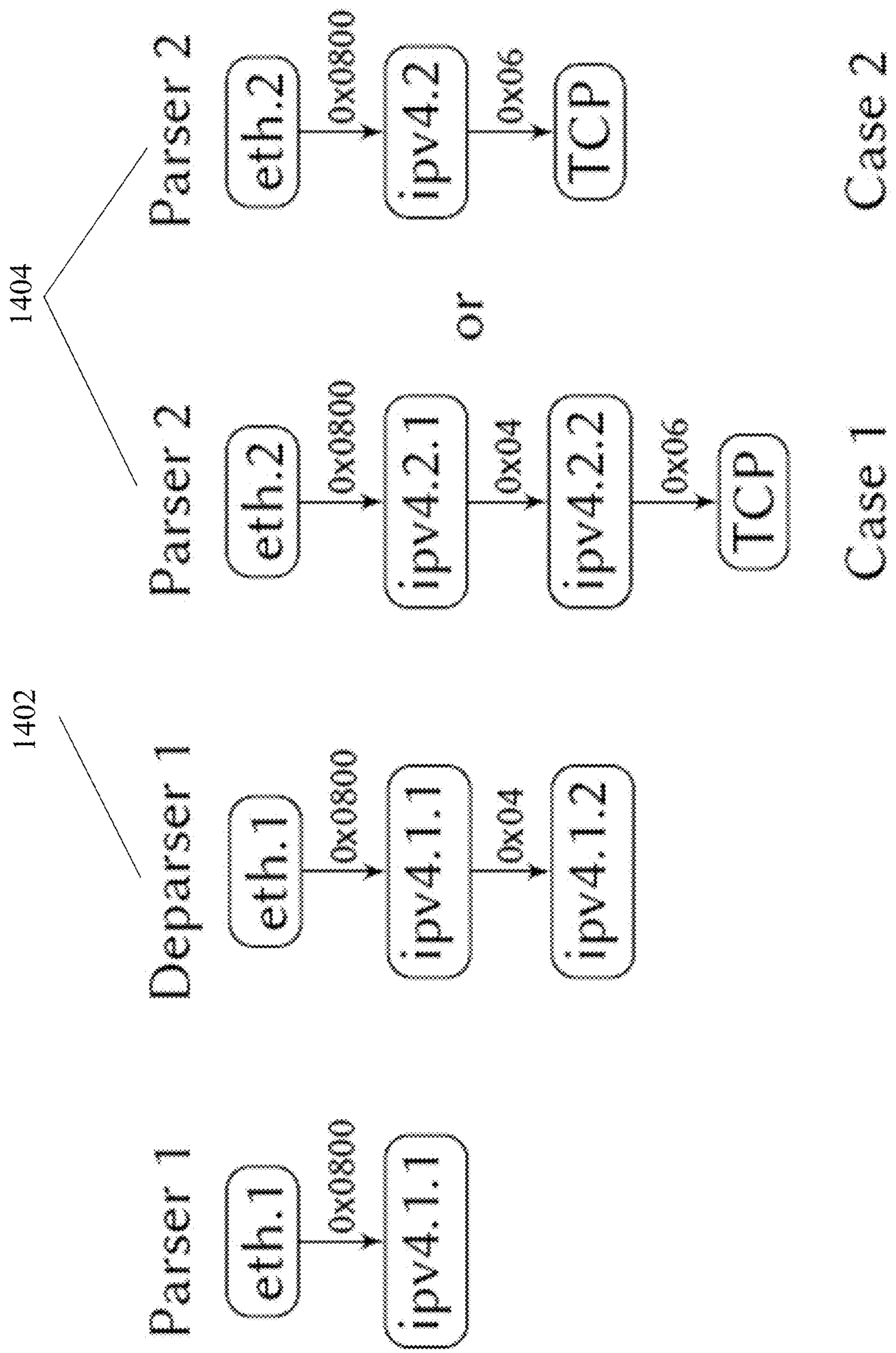
FIG. 14 is a schematic representation of a module adding a new header instance.

Callee_1 may modify the relative location of the headers in the packets in three different ways. First, as shown in FIG. 14, callee_1 may add new header instances to a packet. A first deparser 1402 of callee_1 inserts a new IPv4-header, ipv4.1.2, after the extracted IPv4-header, ipv4.1.1, and can copy new content into the header for piv4.1.2. Also, callee_1 may initialize ipv4.1.2 with the content of ipv4.1.1 and update ipv4.1.1 with new content. The second parser 1404 of callee_2 may accept the packets due to insertion of a new IPv4-header, shown as case 1, or reject the packets in case 2. To extract all possible headers before the processing by callee_1, the composed parser 706 can pre-parse the TCP-header for callee_2 without necessarily preprocessing the TCP-header.

Figure 15:
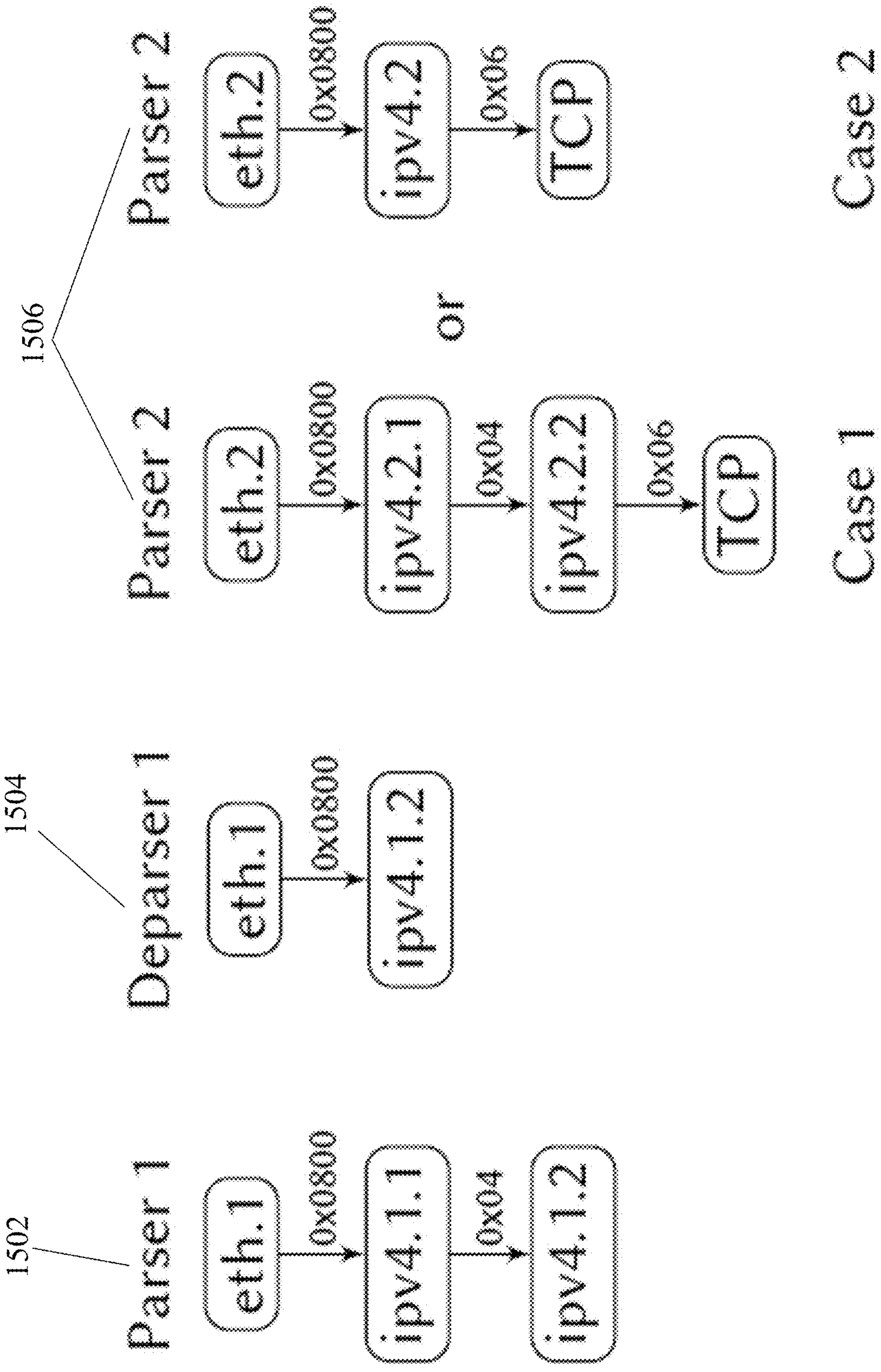
FIG. 15 is a schematic representation of a module removing an extracted header instance.

Second, as shown in FIG. 15, callee_1 may remove extracted header instances from a packet. A first deparser 1504 of callee_1 can remove an IPv4-header from the packets having at least two IPv4-headers, and may remove either of the IPv4-headers and copy the content of the removed header instance to ipv4.1.2. A second parser 1506 of callee_2 may accept or reject the packet processed by the first parser 1502 of callee_1.

Figure 16:
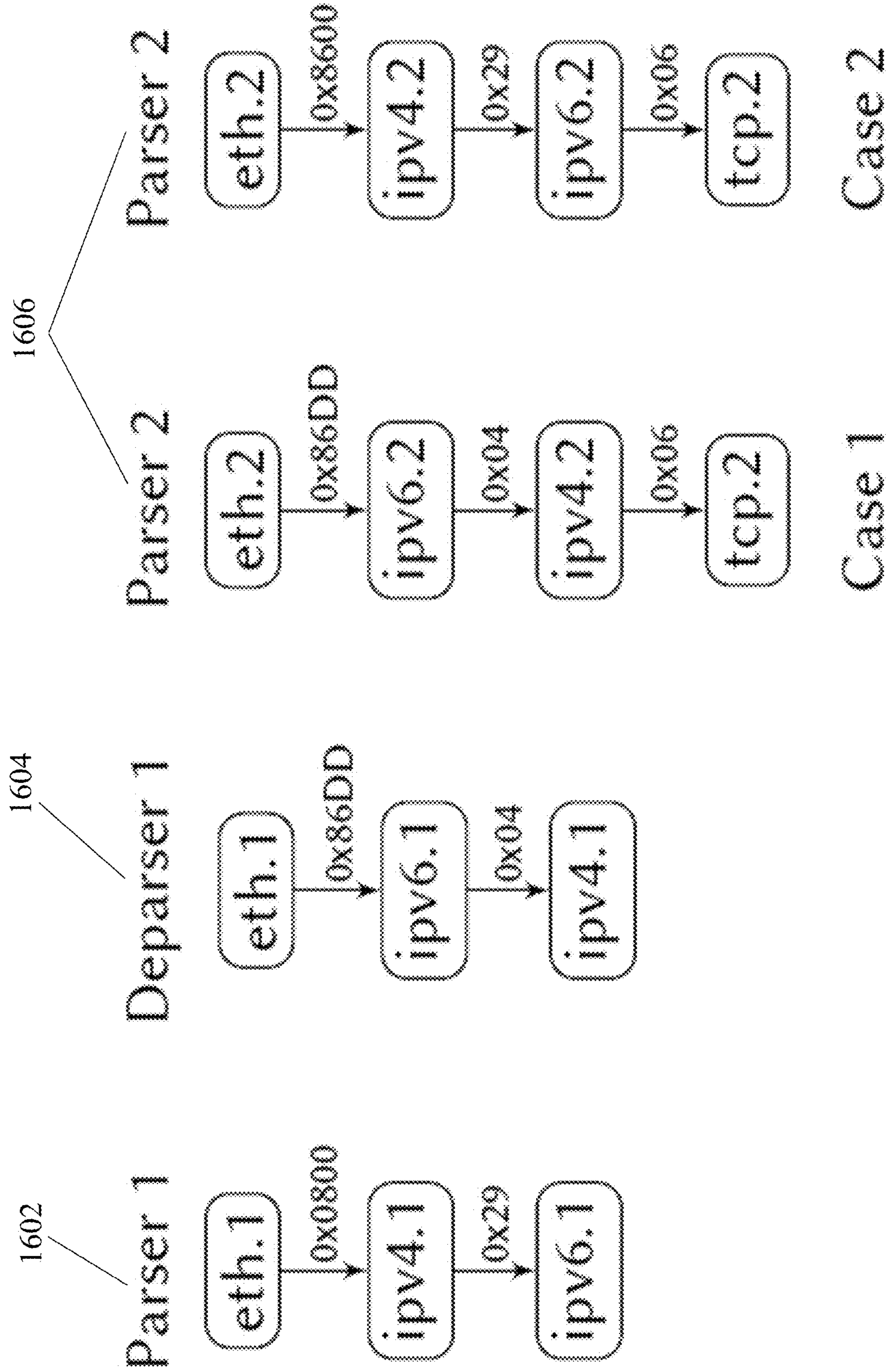
FIG. 16 is a schematic representation of a deparser rearranging headers in a different order than extracted by the parser.

Third, as shown in FIG. 16, callee_1 may rearrange headers in a different order than extracted by its parser. A first deparser 1604 of callee_1 swaps the IPv4-header, ipv4.1, with the IPv6-header ipv6.1. In addition, the second parser 1606 of callee_2 extracts tcp.2 which is not extracted or emitted by callee_1.

Figure 17:
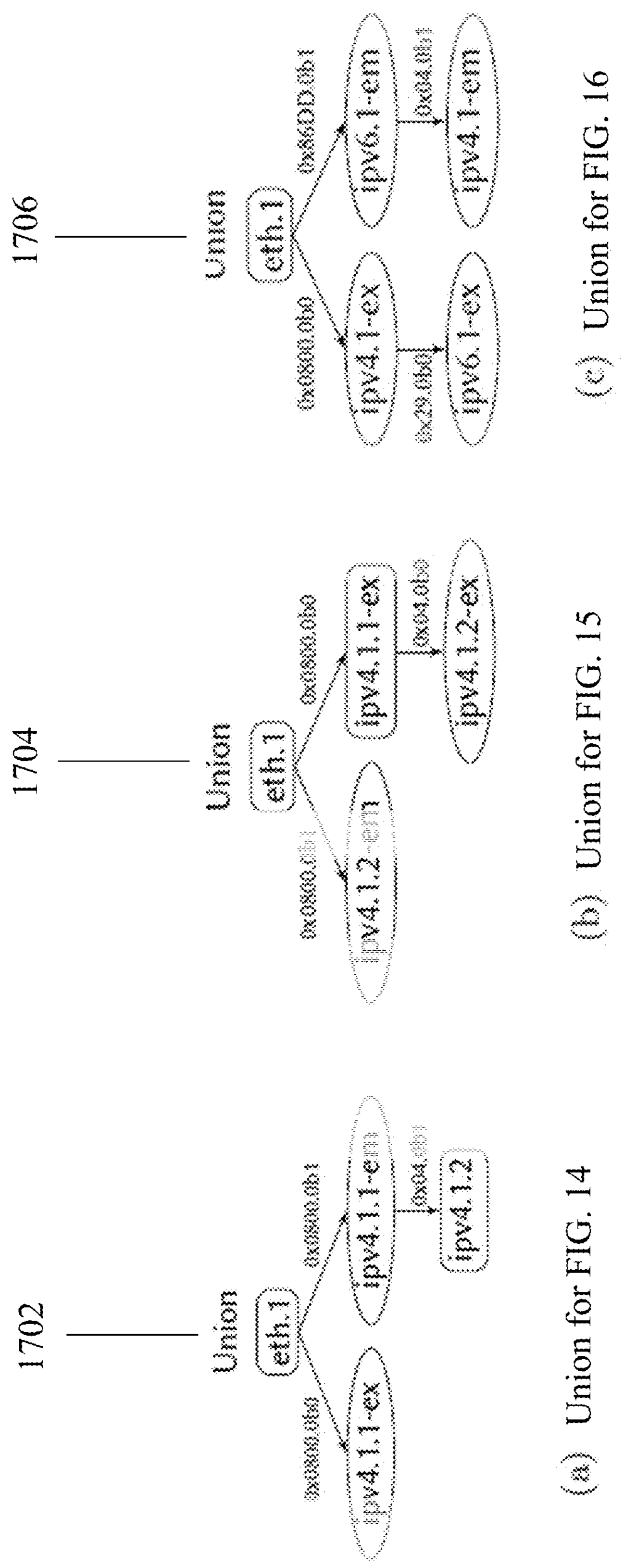
FIG. 17 is a schematic representation of union-state machines of FIGS. 14, 15, and 16.

Embodiments can identify modifications by predecessors. Headers can be identified that the parser of callee_2 extracts but that are not extracted or emitted by callee_1. A union can be performed of an underlying finite state machine representing a parser and deparser of callee_1 to capture the relative change in header arrangement. In the example of FIG. 15, a union results in multiple possible transitions from eth.1 if its EtherType field is 0x0800. The first deparser 1504 state-machine emits ipv4.1.2, whereas the first parser 1502 extracts ipv4.1.1 on the same value, 0x0800, for EtherType field of eth.1 header. Adding a header validity bit in transition criteria eliminates the ambiguity between first deparser 1504 and first parser 1502 because, in the example of FIG. 15, the parser state-machines, e.g., first parser 1502, should extract bits from packet bit-stream of the original packets only in invalid headers, and first deparser 1504 should emit only valid header instances. FIG. 17 provides an example of the union state-machines of the parsers and deparsers shown in FIGS. 14, 15, and 16. The union state-machine 1702 is of the parsers and deparsers shown in FIG. 14, the union state-machine 1704 is of the parsers and deparsers shown in FIG. 15, and the union state-machine 1706 is of the parsers and deparsers shown in FIG. 16.

If the union of state-machines of callee_1's parser and deparser induces a cycle, deparser states are replicated to remove it. For example, first parser 1602 and first deparser 1604 of callee_1 shown in FIG. 16 may induce a cycle in their union state-machine 1706.

As shown in FIG. 16, ipv4.1 and ipv6.1 of callee_1, e.g., states of the first parser 1602, are mapped to ipv4.2 and ipv6.2 of callee_2, e.g., second parser 1606 in both cases. The union state-machine 1706 can be used with the second parser 1606 of callee_2 to map header instances of callee_1 and callee_2 using the same method for composing parsers and deparsers for modules in branches of control statements.

Figure 18:
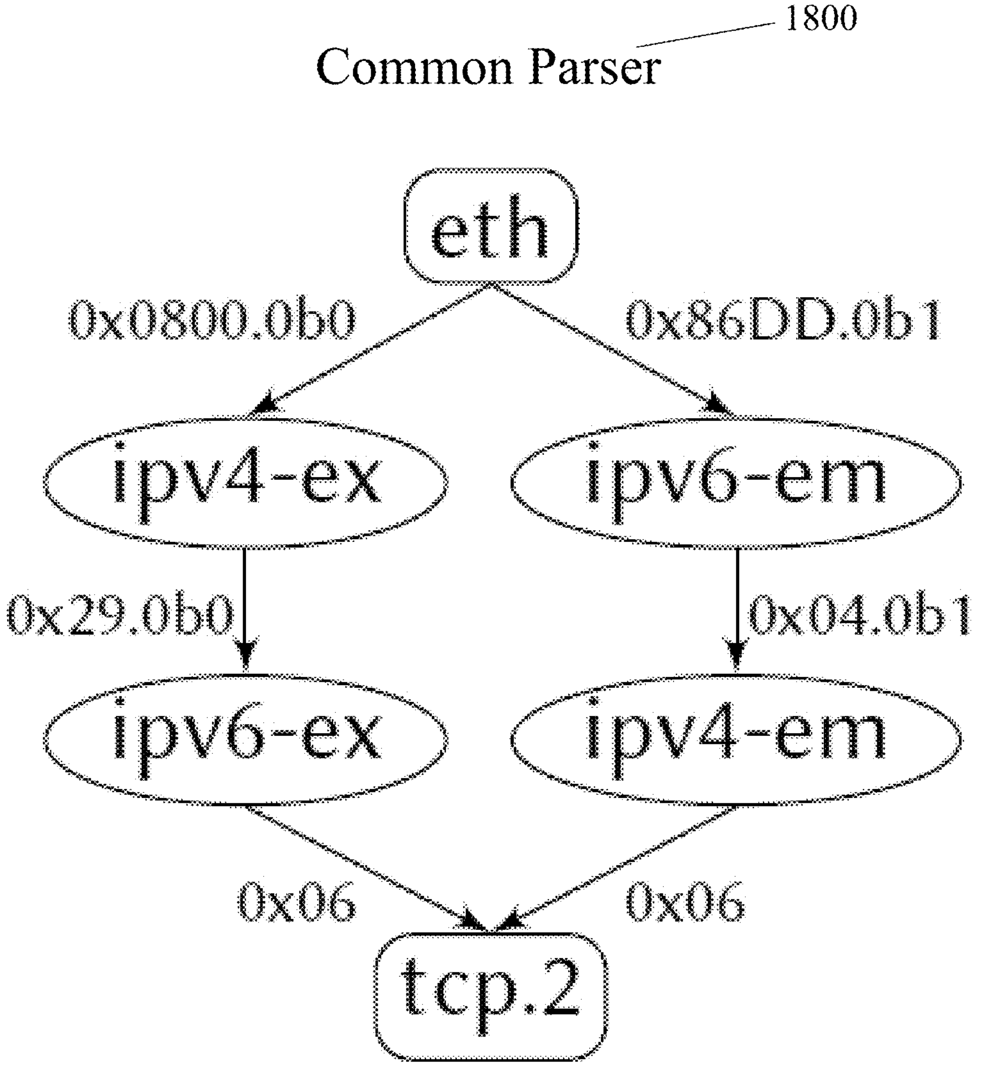
FIG. 18 is a schematic representation using a pre-parsing hook.

Embodiments can parse headers for successors in advance. Network packets, in most cases, are encoded by maintaining data dependency among the encoded protocol headers. In the example of FIG. 16, a callee_2 whose header instances remained unmapped, e.g., tcp.2, may be required to parse in advance. Their predecessor, called pre-parsing hooks, maps to header instances of callee_1. Pre-parsing hooks help to identify data dependency between header instances not extracted by callee_1, e.g., the first parser 1602, but by callee_2, e.g., second parser 1606. In case 1, as shown in the process 1800 of FIG. 18, ipv4.1 has provided data dependency to pre-parse tcp.2 and for case 2, ipv6.1. Callee_1 may modify the pre-parsing hooks. Data-flow analysis using the use-def chain reveals all the definitions of pre-parsing hooks if modified. A simple data-flow analysis, such as use-definition, could operate on the DAGs of the parsers and deparsers, and could also reveal all possible definitions of ipv4.1 in callee_1 and may modify pre-parsing hooks.

In case 1 of FIG. 16, callee_1 copies the next header (NextHdr) of ipv6.1 header to the protocol field of the ipv4.1 header, modifying the pre-parsing hook. The data flow analysis helps to identify that tcp.2 should be extracted after ipv6.1 and not ipv4.1. Therefore, a transition is added from ipv6.1 to tcp.2 on 0x06, as shown in the common parser 1800 of FIG. 18. Additionally, states and transitions can then be removed that are present only in callee_1's 1604 deparser, and may not be included in the common deparser.

In the example of FIG. 14, two modules are invoked in a sequential order, and the first module adds a protocol header. In the example of FIG. 15, two modules are invoked in a sequential order, and the first module removes a protocol header.

Embodiments can use code-synthesis to update packet validity two modules, match header validity bits, and appropriately update validity of the packets for callee_2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for manipulating an intermediate representation of a modular packet-processing program, the method comprising:
 - receiving a plurality of modules configured to be conditionally executed, the plurality of modules comprising at least two parsers;
 - ordering, topologically, at least two extracted header instances in a state of each of the at least two parsers;
 - mapping the at least two header instances to use a common memory block;
 - constructing a common parser directed-acyclic-graph (DAG);
 - synthesizing a bitwise operation on a header instance validity bit and a packet validity bit of a common state in the common parser DAG; and
 - outputting the common parser DAG into the intermediate representation.

2. The method of claim 1, wherein outputting the common parser DAG comprises instantiating the common parser DAG in a packet-processing hardware device.

3. The method of claim 1, further comprising:
 - identifying a cycle in the common parser DAG; and
 - removing the cycle from the common parser DAG by replicating the nodes of the cycle in the common parser DAG.

4. The method of claim 1, wherein synthesizing the bitwise operation comprises:
 - setting, by a start state of the common parser DAG, a packet validity field for each of the plurality of modules;
 - resetting a packet validity bit of the packet validity field of a respective one of the plurality of modules if a parse-state does not belong to the respective one of the plurality of modules;
 - operating bitwise on a header instance validity bit and the packet validity bit for each of the plurality of modules; and
 - masking the packet validity bit for each of the plurality of modules to the header instance validity bit.

5. A device comprising one or more hardware processors which, alone or in combination, are configured to provide for execution of the method of claim 1.

6. A tangible, non-transitory computer-readable medium having instructions thereon which, upon being executed by one or more hardware processors, alone or in combination, provide for execution of the method of claim 1.

7. A method for manipulating an intermediate representation of a modular packet-processing program, the method comprising:
 - receiving a plurality of modules configured to be conditionally executed, the plurality of modules comprising at least two deparsers;
 - ordering, topologically, at least two extracted header instances in a state of each of the at least two deparsers;
 - mapping the at least two header instances to use a common memory block;
 - constructing a common deparser directed-acyclic-graph (DAG); and outputting the common deparser DAG into the intermediate representation.

8. A tangible, non-transitory computer-readable medium having instructions thereon which, upon being executed by one or more hardware processors, alone or in combination, provide for execution of the method of claim 5.

9. A method for manipulating an intermediate representation of a modular packet-processing program, the method comprising:

receiving a first module and a second module configured to be sequentially executed, respectively, the first module comprising a first parser and a first deparser, the second module comprising a second parser and a second deparser;

constructing a union directed-acyclic-graph (DAG) using a DAG of the first parser and a DAG of the first deparser;

identifying a pre-parsing hook using static analysis of the first module and the second module;

constructing a common parser DAG using the union DAG and a DAG of the second parser; and updating a packet validity bit after the first module by synthesizing code; and outputting the common parser DAG into the intermediate representation.

10. The method of claim 9, further comprising:

ordering, topologically, at least two extracted header instances in a state of each of the first deparser and the second deparser;

mapping the at least two header instances to use a common memory block;

constructing a common deparser DAG; and outputting the common deparser DAG into the intermediate representation.

11. The method of claim 9, wherein outputting the common parser DAG comprises instantiating the common parser DAG in a packet-processing hardware device.

12. The method of claim 9, wherein synthesizing code comprises:

adding a header instance validity bit in a selection key of each state of the first module and the second module;

identifying outgoing edges using the header instance validity bit; and identifying connected states using the header instance validity bit.

13. The method of claim 9, further comprising:

receiving a plurality of modules configured to be conditionally executed, the plurality of modules comprising at least two conditioned parsers;

ordering, topologically, at least two extracted header instances in a state of each of the at least two conditioned parsers;

mapping the at least two header instances to use a second common memory block;

constructing a conditional common parser DAG;

synthesizing a bitwise operation on a header validity bit and a packet validity bit of a common state in the conditional common parser DAG; and outputting the conditional common parser DAG into the intermediate representation.

14. The method of claim 9, wherein outputting the common parser DAG comprises applying the common parser DAG to a compiler in a P4 programming language.

15. The method of claim 9, wherein outputting the common parser DAG comprises applying the common parser DAG to a Clang-LLVM toolchain configured to compile express data path (XDP) programs into Berkeley packet filter (BPF) byte code.

* * * * *